United States Patent
Takahashi et al.

(10) Patent No.: US 12,091,732 B2
(45) Date of Patent: Sep. 17, 2024

(54) NANOCOMPOSITE METAL MATERIAL AND METHOD FOR MANUFACTURING NANOCOMPOSITE METAL MATERIAL

(71) Applicant: TECHNOVA INC., Tokyo (JP)

(72) Inventors: Akito Takahashi, Tokyo (JP); Joji Hachisuka, Tokyo (JP); Yuichi Furuyama, Kobe (JP)

(73) Assignee: TECHNOVA INC., Tokyo (JP)

( * ) Notice: Subject to any disclaimer, the term of this patent is extended or adjusted under 35 U.S.C. 154(b) by 250 days.

(21) Appl. No.: 17/640,736

(22) PCT Filed: Sep. 7, 2020

(86) PCT No.: PCT/JP2020/033824
§ 371 (c)(1),
(2) Date: Mar. 4, 2022

(87) PCT Pub. No.: WO2021/045230
PCT Pub. Date: Mar. 11, 2021

(65) Prior Publication Data
US 2022/0339698 A1    Oct. 27, 2022

(30) Foreign Application Priority Data

Sep. 6, 2019   (JP) ................. 2019-163326
Sep. 20, 2019  (JP) ................. 2019-172247

(51) Int. Cl.
*B32B 5/16*      (2006.01)
*B22F 1/054*     (2022.01)
(Continued)

(52) U.S. Cl.
CPC .............. *C22C 16/00* (2013.01); *B22F 1/054* (2022.01); *B22F 1/08* (2022.01); *B22F 1/18* (2022.01);
(Continued)

(58) Field of Classification Search
None
See application file for complete search history.

(56) References Cited

U.S. PATENT DOCUMENTS

| | | |
|---|---|---|
| 4,839,085 A | 6/1989 | Sandrock et al. |
| 5,654,246 A | 8/1997 | Newkirk et al. |
| (Continued) | | |

FOREIGN PATENT DOCUMENTS

| | | | |
|---|---|---|---|
| CN | 1829567 A | | 9/2006 |
| CN | 106423171 A | * | 2/2017 |
| (Continued) | | | |

OTHER PUBLICATIONS

English translation of CN 109174120 (originally published Jan. 11, 2019), obtained from PE2E search.*

(Continued)

*Primary Examiner* — George Wyszomierski
(74) *Attorney, Agent, or Firm* — Rothwell, Figg, Ernst & Manbeck, P.C.

(57) ABSTRACT

A nanocomposite metal material includes a carrier formed of Zr and two-element metal particles supported on the carrier. The two-element metal is formed of Cu and Ni, and a degree of oxidation of the carrier is more than 31% and 100% or less. In a case where the nanocomposite metal material is disposed in a reaction furnace of a thermal reactor, the inside of the reaction furnace is brought into a vacuum state, and the inside of the reaction furnace is heated to a temperature range of 250° C. or higher and 350° C. or lower with a heating mechanism included in the thermal reactor while supplying at least one of hydrogen gas and deuterium gas into the reaction furnace, excessive heat of the nanocomposite metal material is 100 W/kg or more.

3 Claims, 13 Drawing Sheets

(51) Int. Cl.
  *B22F 1/08* (2022.01)
  *B22F 1/18* (2022.01)
  *B22F 9/00* (2006.01)
  *B22F 9/02* (2006.01)
  *B22F 9/04* (2006.01)
  *C22C 16/00* (2006.01)
  *B22F 1/17* (2022.01)

(52) U.S. Cl.
  CPC .............. *B22F 9/002* (2013.01); *B22F 9/023* (2013.01); *B22F 9/04* (2013.01); *B32B 5/16* (2013.01); *B22F 1/17* (2022.01); *B22F 2009/049* (2013.01); *B22F 2201/013* (2013.01); *B22F 2301/10* (2013.01); *B22F 2301/15* (2013.01); *B22F 2301/205* (2013.01); *B22F 2301/25* (2013.01); *B22F 2303/01* (2013.01)

(56) References Cited

U.S. PATENT DOCUMENTS

| | | | |
|---|---|---|---|
| 2002/0088965 | A1 | 7/2002 | Ogata et al. |
| 2004/0161641 | A1 | 8/2004 | Lee et al. |
| 2004/0179994 | A1 | 9/2004 | Fenouil et al. |
| 2005/0048356 | A1* | 3/2005 | Ihringer ............ H01M 8/2483 429/495 |
| 2006/0185771 | A1 | 8/2006 | Inoue et al. |
| 2007/0036710 | A1 | 2/2007 | Fenouil et al. |
| 2007/0037690 | A1 | 2/2007 | Fenouil et al. |
| 2009/0186211 | A1 | 7/2009 | Chun et al. |
| 2011/0119994 | A1* | 5/2011 | Hogendoorn ............ C10G 3/46 44/307 |
| 2014/0322114 | A1* | 10/2014 | Jen ......................... B01J 23/755 502/328 |
| 2016/0155518 | A1 | 6/2016 | Mizuno |
| 2018/0201559 | A1 | 7/2018 | Martin et al. |

FOREIGN PATENT DOCUMENTS

| | | |
|---|---|---|
| CN | 109174120 A * | 1/2019 |
| DE | 68909590 T2 | 1/1994 |
| GB | 2077487 A | 12/1981 |
| JP | H02-179836 A | 7/1990 |
| JP | 2004-253385 A | 9/2004 |
| JP | 2006-517172 A | 7/2006 |
| JP | 2009-263796 A | 11/2009 |
| JP | 2013-215701 A | 10/2013 |
| JP | 2018-521844 A | 8/2018 |
| WO | 2015/008859 A3 | 1/2015 |

OTHER PUBLICATIONS

English translation of CN 106423171 (originally published Feb. 22, 2017), obtained from PE2E search.*

Iwamura, Y. et al., "Replication Experiments at Tohoku University on Anomalous Heat Generation Using Nickel-based Binary Nanocomposites and Hydrogen Isotope Gas", J. Condensed Matter Nuclear Science, vol. 24, pp. 191-201, Oct. 1, 2017.*

Kitamura, Akira, et al., "Excess heat evolution from nanocomposite samples under exposure to hydrogen isotope gases", International Journal of Hydrogen Energy, vol. 43, No. 33, 2018, pp. 16187-16200.

Kitla, Astrid et al., "Infrared Studies on Bimetallic Copper/Nickel Catalysts Supported on Zirconia and Ceria/Zirconia", Catal Letters, vol. 143, No. 6, 2013, pp. 517-530.

Ma, Zhiming et al., "Pd—Ni doped sulfated zirconia: Study of hydrogen spillover and isomerization of N-hexane", Molecular Catalysis, vol. 449, 2018, pp. 114-121.

International Search Report and Written Opinion mailed Nov. 10, 2020 in PCT/US2020/033824 (3 pages).

The International Society for Condensed Matter Nuclear Science, "Book of Abstracts", 22nd International Conference on Condensed Matter Nuclear Science (ICCF22), Aug. 18, 2019 (85 pages).

A. Takahashi et al., "Latest Progress in Research on AHE and Circumstantial Nuclear Evidence by Interaction of Nano-Metal and H(D)-Gas", ICCF22, Sep. 8-13, 2019, Assisi, Italy (123 pages).

A. Takahashi et al., "Repeated Calcination and AHE by PNZ6 Sample", For Proceedings paper to JCF19 JCFRS, ISSN 2187-2260, 2019 (17 pages).

T. Yokose et al., "Anomalous Heat Burst by CNZ7 Sample and H-Gas", For Proceedings paper to JCF19 JCFRS, JCFRS, ISSN 2187-2260, 2019 (18 pages).

* cited by examiner

NANOCOMPOSITE METAL MATERIAL AND METHOD FOR MANUFACTURING NANOCOMPOSITE METAL MATERIAL

CROSS-REFERENCE TO RELATED APPLICATIONS

This application is national stage application of International Application No. PCT/JP2020/033824, filed Sep. 7, 2020, which designates the United States, incorporated herein by reference, and which claims the benefit of priority from Japanese Patent Application No. 2019-163326, filed Sep. 6, 2019, and Japanese Patent Application No. 2019-172247, filed Sep. 20, 2019, the entire contents of which are incorporated herein by reference.

TECHNICAL FIELD

An embodiment of the present invention relates to a nanocomposite metal material and a method for manufacturing a nanocomposite metal material.

BACKGROUND ART

A technique using metal nanoparticles for an exothermic reaction with hydrogen is disclosed. For example, a technique for causing an exothermic reaction by supplying hydrogen gas to a reactant having a surface on which a plurality of metal nanoprotrusions formed of a hydrogen absorbing metal are formed is disclosed.

SUMMARY OF INVENTION

A nanocomposite metal material of an embodiment includes: a carrier formed of Zr; and two-element metal particles supported on the carrier and formed of Cu and Ni. A degree of oxidation of the carrier is more than 31% and 100% or less. In a case where the nanocomposite metal material is disposed in a reaction furnace of a thermal reactor, the inside of the reaction furnace is brought into a vacuum state, and the inside of the reaction furnace is heated to a temperature range of 250° C. or higher and 350° C. or lower with a heating mechanism included in the thermal reactor while supplying at least one of hydrogen gas and deuterium gas into the reaction furnace, excessive heat of the nanocomposite metal material is 100 W/kg or more, the excessive heat being calculated by comparison with data of a calorific value correction test in which a non-heating blank sample of zirconia beads is charged in the reaction furnace.

A nanocomposite metal material of an embodiment includes: a carrier formed of Zr; and two-element metal particles supported on the carrier and formed of Pd and Ni. A degree of oxidation of the carrier is 3% or more and 100% or less. In a case where the nanocomposite metal material is disposed in a reaction furnace of a thermal reactor, the inside of the reaction furnace is brought into a vacuum state, and the inside of the reaction furnace is heated to a temperature range of 250° C. or higher and 350° C. or lower with a heating mechanism included in the thermal reactor while supplying at least one of hydrogen gas and deuterium gas into the reaction furnace, excessive heat of the nanocomposite metal material is 40 W/kg or more, the excessive heat being calculated by comparison with data of a calorific value correction test in which a non-heating blank sample of zirconia beads is charged in the reaction furnace.

DESCRIPTION OF EMBODIMENTS

Hereinafter, an embodiment of the present invention will be described.

A nanocomposite metal material of the present embodiment is a metal composite material including a carrier formed of ceramic and two-element metal particles supported on the carrier and formed of Cu or palladium (Pd) and nickel (Ni).

Figure 1:
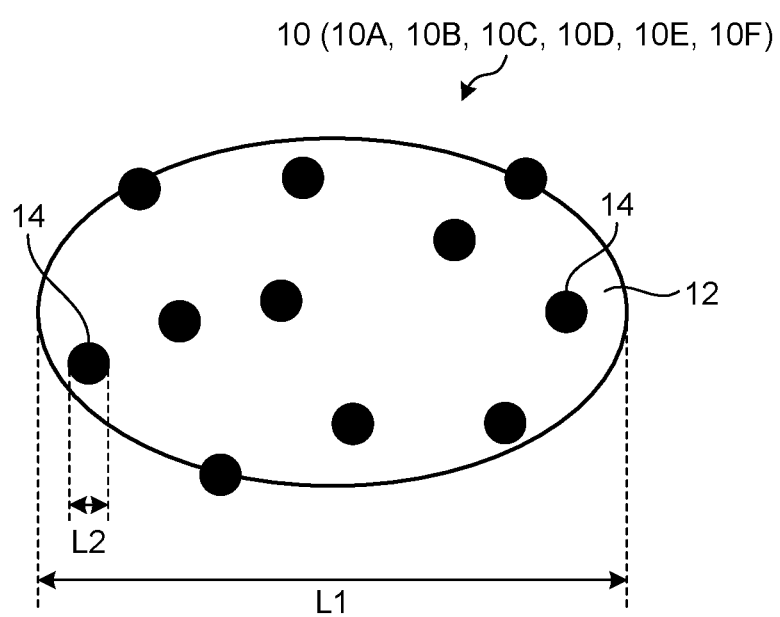
FIG. 1 is a schematic view illustrating an example of a nanocomposite metal material according to an embodiment.

FIG. 1 is a schematic view illustrating an example of a nanocomposite metal material 10 of the present embodiment.

For example, the nanocomposite metal material 10 has a configuration in which two-element metal particles 14 are supported on the inside and a surface of a carrier 12. Note that "supported on the carrier 12" means a state where the two-element metal particles 14 are adhered or fused to the inside and the surface of the carrier 12 by a chemical treatment such as firing. In addition, "supported on the inside of the carrier 12" means that the two-element metal particles 14 are supported on surfaces of nanopores of the carrier 12.

The carrier 12 is formed of ceramic. Specifically, the carrier 12 is ceramic having the inside and a surface in which nanosized nanopores are formed. In the present embodiment, the nanosize means a range of 2 nm or more and 50 nm or less.

The ceramic constituting the carrier 12 is, for example, zirconium (Zr), zirconia ($ZrO_2$), mesoporous silica, zeolite, carbon nanotube, or the like.

An outer shape of the carrier 12 is not particularly limited. The outer shape of the carrier 12 may be, for example, any shape such as a spherical shape, an elliptical shape, or a polygonal shape.

The two-element metal particles 14 are supported on the inside and the surface of the carrier 12. Specifically, the two-element metal particles 14 are supported in the nanopores formed inside and in the surface of the carrier 12.

The two-element metal particle 14 is a metal nanoparticle formed of two elements of Cu and Ni or Pd and Ni. Specifically, the two-element metal particle 14 is a particle having a core-shell structure with Ni as a core and Cu or Pd as a shell.

An outer shape of the two-element metal particle 14 is not particularly limited. The outer shape of the two-element metal particle 14 may be, for example, any shape such as a spherical shape, an elliptical shape, a polygonal shape, a linear shape, or a string shape in a state where at least a part is twisted.

A range of a volume average particle size of the nanocomposite metal material 10 includes at least a range of 0.01 mm or more and 1 mm or less. It is more preferable that the range of the volume average particle size of the nanocomposite metal material 10 includes at least a range of 0.05 mm or more and 0.3 mm or less. Note that the range of the volume average particle size of the nanocomposite metal material 10 may further include a range of 0.05 mm or more and 0.5 mm or less.

Specifically, it is preferable that the range of the volume average particle size of the nanocomposite metal material 10 including the carrier 12 that supports the two-element metal particles 14 formed of two elements of Cu and Ni and is formed of Zr includes at least a range of 0.1 mm or more and 1.0 mm or less. In addition, it is preferable that the range of the volume average particle size of the nanocomposite metal material 10 including the carrier 12 that supports the two-element metal particles 14 formed of two elements of Pd and Ni and is formed of Zr includes at least a range of 0.05 mm or more and 1.0 mm or less.

In a case where the nanocomposite metal material 10 has the configuration illustrated in FIG. 1, the volume average particle size of the nanocomposite metal material 10 indicates a volume average particle size of the carrier 12 (see the particle size L1).

A volume average particle size of the two-element metal particles 14 is, for example, preferably in a range of 2 nm or more and 50 nm or less, more preferably in a range of 2 nm or more and 20 nm or less, and still more preferably in a range of 2 nm or more and 10 nm or less.

The volume average particle size of each of the nanocomposite metal material 10 and the two-element metal particles 14 is measured, for example, by the following method.

Specifically, the volume average particle size and the shape of each of the nanocomposite metal material 10 and the two-element metal particle 14 are subjected to image analysis with a resolution of 1 nm or less by measuring an element distribution map under a condition of 200 keV electron beam scan using STEM/EDS (trade name) manufactured by NEC Corporation as a measuring apparatus, thereby measuring the volume average particle size.

The nanocomposite metal material 10 of the present embodiment is classified into eight types of a nanocomposite metal material 10A, a nanocomposite metal material 10B, a nanocomposite metal material 10C, a nanocomposite metal material 10D, a nanocomposite metal material 10E, a nanocomposite metal material 10F, a nanocomposite metal material 10G, and a nanocomposite metal material 10H by a manufacturing method to be described below. The manufacturing methods of the nanocomposite metal material 10A, the nanocomposite metal material 10B, the nanocomposite metal material 10C, the nanocomposite metal material 10D, the nanocomposite metal material 10E, the nanocomposite metal material 10F, the nanocomposite metal material 10G, and the nanocomposite metal material 10H are different from each other. Note that in the present invention, in a case where the nanocomposite metal material 10A, the nanocomposite metal material 10B, the nanocomposite metal material 10C, the nanocomposite metal material 10D, the nanocomposite metal material 10E, the nanocomposite metal material 10F, the nanocomposite metal material 10G, and the nanocomposite metal material 10H are collectively described, these nanocomposite metal materials are simply referred to as the nanocomposite metal material 10.

The nanocomposite metal material 10 of the present embodiment can increase a calorific value using an exothermic reaction with hydrogen. Hereinafter, each of the nanocomposite metal material 10A, the nanocomposite metal material 10B, the nanocomposite metal material 10C, the nanocomposite metal material 10D, the nanocomposite metal material 10E, the nanocomposite metal material 10F, the nanocomposite metal material 10G, and the nanocomposite metal material 10H will be described in detail.

<Nanocomposite Metal Material 10A>

First, the nanocomposite metal material 10A and the method for manufacturing a nanocomposite metal material 10A will be described.

The nanocomposite metal material 10A is a nanocomposite metal material 10 including a carrier 12 formed of Zr and two-element metal particles 14 supported on the carrier 12 and formed of Cu and Ni, in which a degree of oxidation of the carrier 12 formed of Zr is more than 31% and 100% or less. Note that, hereinafter, the carrier 12 formed of Zr may be simply referred to as a carrier 12.

The degree of oxidation of the carrier 12 in the nanocomposite metal material 10A is required to be more than 31% and 100% or less, and is preferably 50% or more and 100% or less, more preferably 80% or more and 100% or less, and particularly preferably 90% or more and 100% or less.

A method for measuring a degree of oxidation of the nanocomposite metal material 10A will be described below.

As for the nanocomposite metal material 10A, there is provided a firing step of firing fine metal particles obtained by pulverizing an amorphous metal composed of Cu, Ni, and Zr at 300° C. or higher and 600° C. or lower to obtain a nanocomposite metal material 10A.

Figure 2:
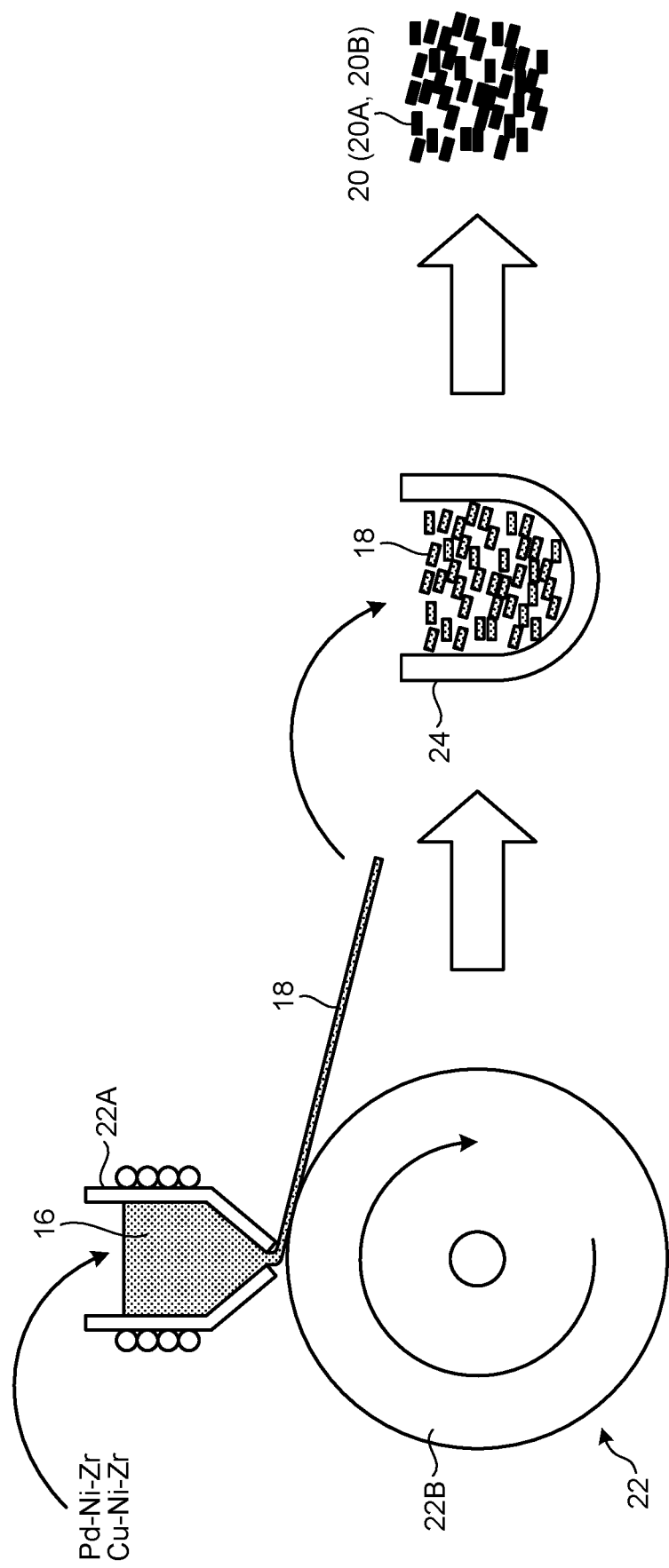
FIG. 2 is an explanatory diagram of an example of the nanocomposite metal material and a firing step of the nanocomposite metal material according to the embodiment.

FIG. 2 is an explanatory diagram of an example of the nanocomposite metal material 10A and a firing step of a nanocomposite metal material 10B to be described below.

A case where Zr is used as the carrier 12 will be described as an example. Note that, in a case where ceramic other than Zr is used as the carrier 12, the same firing step may be performed.

First, an amorphous metal 18 is prepared by melting and quenching a Cu—Ni—Zr alloy by a melt spinning method (melt quenching method). The melt spinning method is a method in which an alloy melted at a high temperature is sprayed on a surface of a roll-shaped member rotating at a high speed to be rapidly cooled in a shorter time than a crystallization time so as to obtain an amorphous metal.

Specifically, the Cu—Ni—Zr alloy is melted by being heated in a heating furnace 22A, and the melted liquid is supplied to a rotating cooling roll 22B. The melted liquid is solidified by coming into contact with the rotating cooling roll 22B to prepare a ribbon-shaped amorphous metal 18. A thickness of the ribbon-shaped amorphous metal 18 is adjusted, for example, in a range of 5 μm or more and 50 μm or less by controlling a supply amount to the cooling roll 22B and a rotational speed of the cooling roll 22B.

Then, the amorphous metal 18 is subjected to an oxidation treatment in the atmosphere. For example, the amorphous metal 18 is injected into a crucible 24 and heating is performed at a temperature of 400° C. or higher and 600° C. or lower for 100 hours or longer and 200 hours or shorter to oxidize the amorphous metal 18. By the oxidation treatment, $ZrO_2$ in which Zr is oxidized is obtained.

Then, a pulverization treatment for pulverizing the oxidized amorphous metal 18 is performed to obtain fine metal particles 20A. The pulverization treatment is performed by an automatic mortar treatment. It is preferable that a range of a volume average particle size of the fine metal particles 20A includes at least a range of 0.05 mm or more and 0.3 mm or less.

Next, the fine metal particles 20A are fired at 300° C. or higher and 600° C. or lower to obtain a nanocomposite metal material 10A. Note that the firing temperature in the firing step is required to be in a range of 300° C. or higher and 600° C. or lower, and is preferably in a range of 400° C. or higher and 500° C. or lower, more preferably in a range of 450° C. or higher and 500° C. or lower, and particularly preferably 450° C. The firing time is preferably in a range of 120 hours or longer and 180 hours or shorter.

As described above, the degree of oxidation of the carrier 12 in the nanocomposite metal material 10A manufactured by the above manufacturing method is more than 31% and 100% or less.

The degree of oxidation of the nanocomposite metal material 10A may be adjusted by controlling the firing temperature and the firing time in the firing step.

In the present embodiment, a ratio of a weight of the nanocomposite metal material 10A, which is the fine metal particle 20A after the firing, to a weight of the fine metal particles 20A before the firing is used as the degree of oxidation of the carrier 12 in the nanocomposite metal material 10A. Specifically, the firing was performed under a firing condition in which firing is performed at 450° C. for 120 hours or longer and 180 hours or shorter, and a weight increase rate of the nanocomposite metal material 10A after the firing with respect to that before the firing was measured. The weight increase rate was calculated as the degree of oxidation that is an increase rate of the amount of oxygen added by the firing.

In a composition of the nanocomposite metal material 10A manufactured by the above manufacturing method, in a case where the carrier 12 is formed of Zr that is ceramic, a ratio of the number of atoms of Cu to Ni (Cu:Ni) is in a range of 1:7 or more and 1:15 or less, and a ratio of the number of atoms of Ni to Zr is in a range of 1:2 or more and 1:4 or less.

Note that the composition of the nanocomposite metal material 10A is preferably in the above range, and the ratio of the number of atoms of Cu to Ni (Cu:Ni) is preferably in a range of 1:7 or more and 1:12 or less. In addition, the ratio of the number of atoms of Ni to Zr may be in a range of 1:2 or more and 1:4 or less or in a range of 1:2 or more and 1:3 or less.

The composition of the nanocomposite metal material 10A is adjusted by controlling an atomic ratio (mass ratio) in the Cu—Ni—Zr alloy, which is the amount charged at the time of manufacturing the fine metal particles 20A.

<Nanocomposite Metal Material 10B>

The nanocomposite metal material 10B and the method for manufacturing a nanocomposite metal material 10B will be described.

The nanocomposite metal material 10B is a nanocomposite metal material 10 including a carrier 12 formed of Zr and two-element metal particles 14 supported on the carrier 12 and formed of Pd and Ni, in which a degree of oxidation of the carrier 12 formed of Zr is 3% or more and 100% or less.

The degree of oxidation of the carrier 12 formed of Zr in the nanocomposite metal material 10B is required to be 3% or more and 100% or less, and is preferably 20% or more and 100% or less, and more preferably 25% or more and 100% or less.

As for the nanocomposite metal material 10B, there is provided a firing step of firing fine metal particles obtained by pulverizing an amorphous metal composed of Pd, Ni, and Zr at 300° C. or higher and 600° C. or lower to obtain a nanocomposite metal material 10B.

This will be described with reference to FIG. 2. Note that a case where Zr is used as the carrier 12 will be described as an example. Note that, in a case where ceramic other than Zr is used as the carrier 12, the same firing step may be performed.

The nanocomposite metal material 10B is manufactured by a firing step similar to that of the nanocomposite metal material 10A except that a Pd—Ni—Zr alloy is used instead of the Cu—Ni—Zr alloy.

First, an amorphous metal 18 is prepared by melting and quenching a Pd—Ni—Zr alloy by a melt spinning method.

Specifically, the Pd—Ni—Zr alloy is melted by being heated in the heating furnace 22A, and the melted liquid is supplied to the rotating cooling roll 22B. The melted liquid is solidified by coming into contact with the rotating cooling roll 22B to prepare a ribbon-shaped amorphous metal 18. A thickness of the ribbon-shaped amorphous metal 18 is adjusted, for example, in a range of 2 μm or more and 50 μm or less by controlling a supply amount to the cooling roll 22B and a rotational speed of the cooling roll 22B.

Then, the amorphous metal 18 is subjected to an oxidation treatment in the atmosphere. For example, the amorphous metal 18 is injected into a crucible 24 and heating is performed at a temperature of 400° C. or higher and 600° C. or lower for 100 hours or longer and 200 hours or shorter to oxidize the amorphous metal 18. By the oxidation treatment, $ZrO_2$ in which Zr is oxidized is obtained.

Then, a pulverization treatment for pulverizing the oxidized amorphous metal 18 is performed to obtain fine metal particles 20B. The pulverization treatment is performed by an automatic mortar treatment. It is preferable that a range of a volume average particle size of the fine metal particles 20B includes at least a range of 0.05 mm or more and 0.5 mm or less.

Next, the fine metal particles 20B are fired at 300° C. or higher and 600° C. or lower to obtain a nanocomposite metal material 10B. Note that the firing temperature in the firing step is required to be in a range of 300° C. or higher and 600° C. or lower, and is preferably in a range of 450° C. or higher and 600° C. or lower, more preferably in a range of 450° C. or higher and 500° C. or lower, and particularly preferably 450° C. The firing time is preferably in a range of 120 hours or longer and 180 hours or shorter.

As described above, the degree of oxidation of the nanocomposite metal material 10B manufactured by the above manufacturing method is 3% or more and 100% or less.

The degree of oxidation of the nanocomposite metal material 10B may be adjusted by controlling the firing temperature and the firing time in the firing step.

In the present embodiment, similarly to the degree of oxidation of the nanocomposite metal material 10A, a ratio of a weight of the nanocomposite metal material 10B, which is the fine metal particle 20B after the firing, to a weight of the fine metal particles 20B before the firing is used as the degree of oxidation of the carrier 12 formed of Zr in the nanocomposite metal material 10B. The measurement of the degree of oxidation of the carrier 12 formed of Zr in the nanocomposite metal material 10B may be performed in the same manner as the measurement of the degree of oxidation of the nanocomposite metal material 10A.

In a composition of the nanocomposite metal material 10B, in a case where the carrier 12 is formed of Zr that is ceramic, a ratio of the number of atoms of Pd to Ni (Pd:Ni) is in a range of 1:7 or more and 1:15 or less, and a ratio of the number of atoms of Ni to Zr is in a range of 1:2 or more and 1:4 or less.

Note that the composition of the nanocomposite metal material 10B is preferably in the above range, and the ratio of the number of atoms of Pd to Ni (Pd:Ni) is more preferably in a range of 1:7 or more and 1:12 or less. In addition, the ratio of the number of atoms of Ni to Zr may be in a range of 1:2 or more and 1:3 or less.

The composition of the nanocomposite metal material 10B is adjusted by controlling an atomic ratio (mass ratio) in the Pd—Ni—Zr alloy, which is the amount charged at the time of producing the fine metal particles 20B.

<Nanocomposite Metal Material 10C>

Next, the nanocomposite metal material 10C and the method for manufacturing a nanocomposite metal material 10C will be described.

The nanocomposite metal material 10C is a nanocomposite metal material 10 that includes a carrier 12 formed of Zr and two-element metal particles 14 supported on the carrier 12 and formed of Cu and Ni and is manufactured by a manufacturing method different from that of the nanocomposite metal material 10A that is a nanocomposite metal material 10 containing Cu.

The method for manufacturing a nanocomposite metal material 10C includes a hydrogen absorption step and a heating step.

The hydrogen absorption step in the method for manufacturing a nanocomposite metal material 10C is a step of absorbing hydrogen in fine metal particles 20A by supplying hydrogen gas to the fine metal particles 20A. The fine metal particles 20A are the same as described above. The absorption of hydrogen in the fine metal particles 20A is realized by supplying hydrogen gas to the fine metal particles 20A disposed in the reaction furnace in a vacuum state. The hydrogen gas to be supplied may be either deuterium gas or light hydrogen gas.

The heating step in the method for manufacturing a nanocomposite metal material 10C is a step of heating the fine metal particles 20A in which the hydrogen is absorbed to 200° C. or higher and 300° C. or lower under a vacuum state to obtain a nanocomposite metal material 10C. The heating step may be referred to as baking.

A temperature range in the heating step is preferably a range of 200° C. or higher and 450° C. or lower, and may be a range of 200° C. or higher and 500° C. or lower or a range of 250° C. or higher and 400° C. or lower. The temperature range may be appropriately selected according to the material composition and the degree of oxidation. Specifically, the temperature range in the heating step (baking) may be within a range in which a material temperature distribution during the heating is a minimum of 200° C. or higher and 250° C. or lower and a minimum of 350° C. or higher and 450° C. or lower. Note that a period from the start to the end is maintained in a temperature range from a minimum temperature of 200° C. or higher and 250° C. or lower to a maximum temperature of 350° C. or higher and 450° C. or lower.

In addition, the heating time in the heating step may be adjusted according to the heating temperature, the discharge gas pressure, and the like. For example, the heating time is preferably in a range of 10 hours or longer and 72 hours or shorter and more preferably in a range of 24 hours or longer and 72 hours or shorter.

Note that the heating step (baking) is preferably performed a plurality of times. Note that the multiple heating steps indicate the number of repetitions of a series of step counted as one cycle, the series of step ranging until a degree of vacuum reaches 1 Pa or less after starting of heating to 200° C. or higher and 300° C. or lower under a vacuum state. The temperature in the heating step may be changed within the above range according to the gas pressure at the time of start and the amount of gas discharged during the baking.

In the first heating step, it is considered that phenomena such as evaporation of moisture in the fine metal particles 20A in which the hydrogen is absorbed and generation of impurity gas (nitrogen and the like) from the fine metal particles 20A occur. Therefore, it is preferable to use the nanocomposite metal material 10 manufactured by performing the heating step twice or more as the nanocomposite metal material 10C.

In the heating step (baking), the inside of the reaction furnace in a vacuum state is heated in a range of 200° C. or higher and 450° C. or lower. Next, as the hydrogen absorption step, hydrogen gas is set to 0.5 MPa to 1 MPa at room temperature to perform hydrogen absorption. The second heating step (baking) is performed by raising the temperature to 200° C. or higher and 450° C. or lower while exhausting the hydrogen gas present in the reaction furnace. Note that, in a case where the baking is performed three or more times, the same repetition may be performed.

It is considered that the following phenomenon occurs by the hydrogen absorption step and the heating step.

Specifically, it is considered that in the fine metal particles 20A used in the hydrogen absorption step, at least a part of Cu is oxidized by the oxidation treatment of the amorphous metal 18 when preparing the fine metal particles 20A. Note that it is considered that Ni is hardly oxidized. It is considered that when hydrogen is absorbed in the fine metal particles 20A, oxygen atoms of copper oxide react with hydrogen gas, and oxygen is discharged as water or heavy water. Therefore, it is considered that the holes are formed in the surface of the carrier 12 due to separation of the oxygen atoms.

It is considered that at least a part of the absorbed hydrogen is desorbed by heating the fine metal particles 20A in the heating step. It is considered that at the time of the desorption of the hydrogen, the two-element metal particles 14 each having a core-shell structure with Ni as a core and Cu as a shell of an incomplete cover are supported on the carrier 12 in a pulverized state, and the nanocomposite metal material 10C is obtained. It is theoretically presumed that heat generation sites due to hydrogen clusters are formed on surfaces of the complete shell and the Ni core. It is presumed that an increase in the number of heat generation sites is caused by the baking and re-firing of the nanocomposite metal material, which increases excessive heat power. The re-firing corresponds to the above-described firing step of firing the fine metal particles 20A or the fine metal particles 20B at 300° C. or higher and 600° C. or lower to obtain a nanocomposite metal material 10A.

The nanocomposite metal material 10C is manufactured through the hydrogen absorption step and the heating step using, for example, a thermal reactor.

Figure 3:
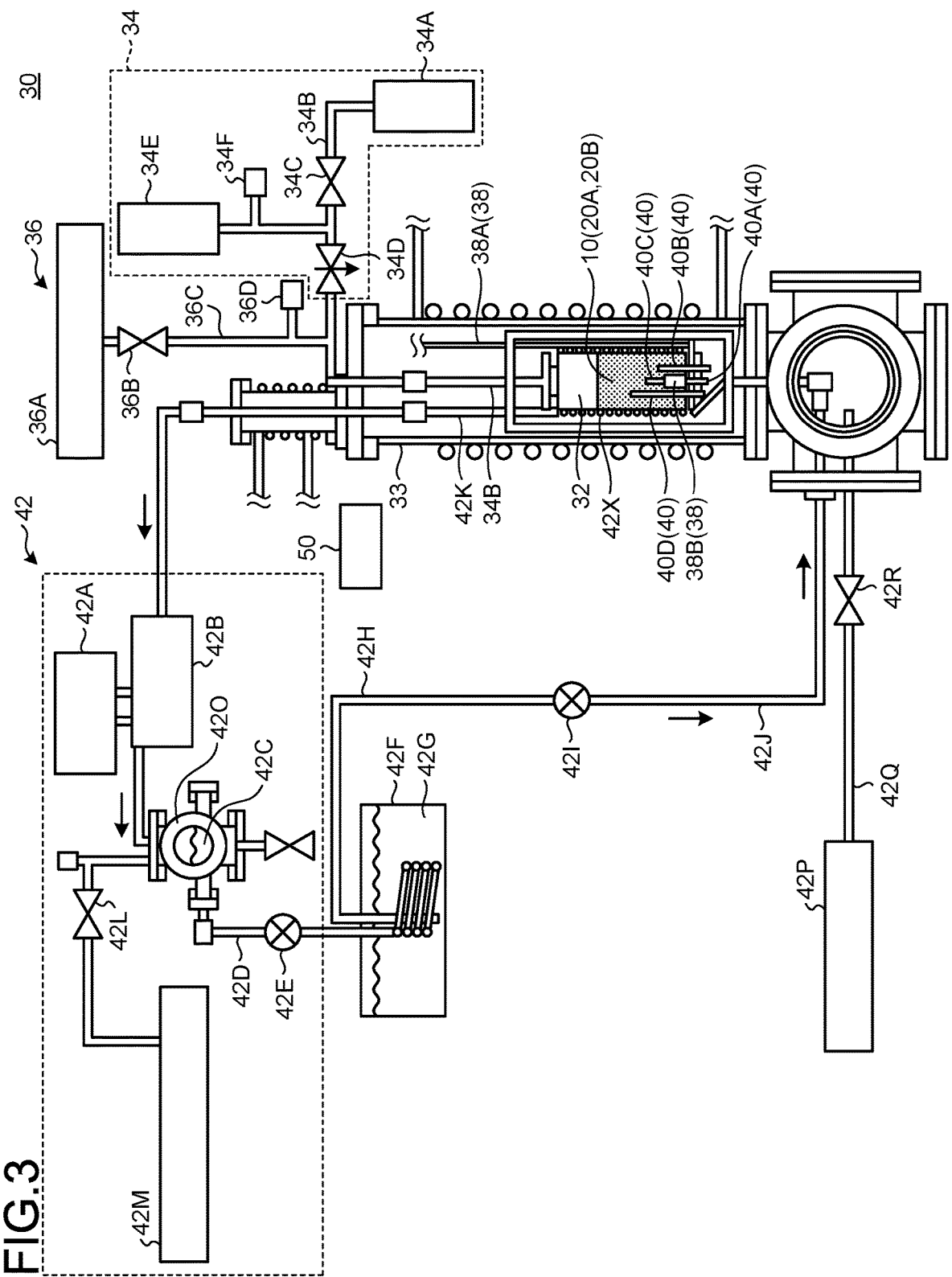
FIG. 3 is a schematic diagram illustrating an example of a thermal reactor according to the embodiment.

FIG. 3 is a schematic diagram illustrating an example of a thermal reactor 30.

The thermal reactor 30 includes a reaction furnace 32 for holding a sample such as the fine metal particles 20A therein. The reaction furnace 32 is disposed in a housing 33. The reaction furnace 32 and the housing 33 are formed of, for example, stainless steel (SUS306 or SUS316) or the like.

The reaction furnace 32 has a hollow and closed shape, and is, for example, a cylindrical member in which both end surfaces are sealed in a longitudinal direction.

A gas supply unit 34 and a vacuum mechanism 36 communicate with the reaction furnace 32 via a pipe 34B.

The gas supply unit 34 includes a gas cylinder 34A, the pipe 34B, a valve 34C, a valve 34D, a tank 34E, and a pressure measurement unit 34F. The gas cylinder 34A stores hydrogen gas such as deuterium gas or light hydrogen gas. The hydrogen gas stored in the gas cylinder 34A is supplied into the reaction furnace 32 via the pipe 34B. The valve 34C and the valve 34D are provided in the pipe 34B, and are used for supplying hydrogen gas and adjusting the pressure. The tank 34E communicates with the reaction furnace 32 via the pipe 34B. The tank 34E is a mechanism for adjusting the pressure in the reaction furnace 32. The pressure measurement unit 34F measures the pressure of the reaction furnace 32.

The vacuum mechanism 36 is a mechanism for evacuating the inside of the reaction furnace 32. The vacuum mechanism 36 includes a vacuum pump 36A, a valve 36B, a pipe 36C, and a pressure measurement unit 36D. The pipe 36C has one end communicating with the reaction furnace 32 via the pipe 34B and the other end communicating with the vacuum pump 36A via the valve 36B. When the vacuum pump 36A is operated, the inside of the reaction furnace 32 is adjusted to a vacuum state. The pressure measurement unit 36D measures the pressure in the reaction furnace 32.

A heating mechanism 38 is provided in the reaction furnace 32. In the present embodiment, the thermal reactor 30 includes a heating unit 38A and a heating unit 38B as the heating mechanism 38. The heating unit 38A heats the reaction furnace 32 from the outside. The heating unit 38B is provided in the reaction furnace 32 and directly heats the inside of the reaction furnace 32.

In addition, a temperature sensor 40 is provided in the reaction furnace 32. The temperature sensor 40 is a sensor that measures the temperature in the reaction furnace 32. In the present embodiment, four temperature sensors 40 of a temperature sensor 40A, a temperature sensor 40B, a temperature sensor 40C, and a temperature sensor 40D are provided in the reaction furnace 32. Note that the number of temperature sensors 40 is not limited to four. The plurality of temperature sensors 40 (the temperature sensor 40A to the temperature sensor 40D) are disposed at positions different from each other in a bottom of the reaction furnace 32. In addition, the plurality of temperature sensors 40 (the temperature sensor 40A to the temperature sensor 40D) are disposed at positions at which the temperatures of the positions different from each other in the longitudinal direction of the reaction furnace 32 can be measured in the reaction furnace 32.

In addition, the thermal reactor 30 includes a circulation mechanism 42. The circulation mechanism 42 is a mechanism for transferring heat generated in the reaction furnace 32 to a fluid by heat exchange with the fluid, and using the heat for hot-water supply, heat supply, power generation, and the like.

In the present embodiment, the circulation mechanism 42 includes a water circulation temperature controller 42A, an oil circulation temperature controller 42B, a fluid 42C, a pipe 42D, an adjustment unit 42E, a water bath 42F, a pipe 42H, a pump 42I, a pipe 42J, a pipe 42K, a valve 42L, a storage unit 42M, a pump 42P, a pipe 42Q, and a valve 42R.

A heat transport pipe 42X is a tubular member and is spirally wound along an outer wall of the reaction furnace 32. The fluid 42C flows in the heat transport pipe 42X. One end of the heat transport pipe 42X in the longitudinal direction communicates with the water circulation temperature controller 42A and the oil circulation temperature controller 42B via the pipe 42K. The water circulation temperature controller 42A and the oil circulation temperature controller 42B are devices for circulating oil (hereinafter, referred to as the fluid 42C) of a circulating fluid. The fluid 42C is supplied to a flow meter 42O and then flows to a water bath 42F via the pipe 42D and the adjustment unit 42E. The flow meter 42O is a known instrument that measures a flow rate of the fluid 42C based on the number of droplets.

The fluid 42C supplied to the water bath 42F is cooled by the liquid 42G stored in the water bath 42F, the fluid 42C is supplied again to the pipe 42X wound around the reaction furnace 32 via the pipe 42H, the pump 42I, and the pipe 42J, and then the fluid 42C is supplied to the pipe 42K after recovering a calorific value.

The storage unit 42M is a mechanism for storing the fluid 42C and communicates with the flow meter 42O via the valve 42L. The pump 42P is connected to a main body of the thermal reactor 30 via the pipe 42Q and the valve 42R.

A control unit 50 for controlling the electronic equipment of the thermal reactor 30 is provided in the thermal reactor 30, and the thermal reactor 30 is controlled by control of the control unit 50.

In a case where the nanocomposite metal material 10C is manufactured using the thermal reactor 30, for example, the following method is used.

For example, first, a hydrogen absorption step is performed. In the hydrogen absorption step, first, the fine metal particles 20A are supplied into the reaction furnace 32, and then, the vacuum mechanism 36 is driven by control of the control unit 50 to bring the inside of the reaction furnace 32 into a vacuum state. Then, hydrogen gas is supplied into the reaction furnace 32 while maintaining the reaction furnace 32 in the vacuum state. The hydrogen gas is supplied by control of the control unit 50.

The hydrogen gas is supplied into the reaction furnace 32, such that hydrogen is absorbed in the fine metal particles 20A.

Next, a heating step is performed. In the heating step, the supply of the hydrogen gas into the reaction furnace 32 is stopped. Then, the heating mechanism 38 is controlled while maintaining the hydrogen gas state of the inside of the reaction furnace 32, such that the inside of the reaction furnace 32 is heated, for example, so that a material temperature distribution during the heating is a minimum of 200° C. or higher and 250° C. or lower and a maximum of 350° C. or higher and 450° C. or lower. The heating mechanism 38 is controlled by the control unit 50. By this heating step, the nanocomposite metal material 10C is manufactured.

In a composition of the nanocomposite metal material 10C, a ratio of the number of atoms of Cu to Ni (Cu:Ni) is in a range of 1:7 or more and 1:15 or less, and a ratio of the number of atoms of Ni to Zr is in a range of 1:2 or more and 1:4 or less.

Note that the composition of the nanocomposite metal material 10C is preferably in the above range, and the ratio of the number of atoms of Cu to Ni (Cu:Ni) is preferably in a range of 1:7 or more and 1:12 or less. In addition, the ratio of the number of atoms of Ni to Zr may be in a range of 1:2 or more and 1:35 or less or in a range of 1:2 or more and 1:2.5 or less.

The composition of the nanocomposite metal material 10C is adjusted by controlling an atomic ratio (mass ratio) in the Cu—Ni—Zr alloy, which is the amount charged at the time of producing the fine metal particles 20A.

<Nanocomposite Metal Material 10D>

Next, the nanocomposite metal material 10D and the method for manufacturing a nanocomposite metal material 10D will be described.

The nanocomposite metal material 10D is a nanocomposite metal material 10 that includes a carrier 12 formed of ceramic and two-element metal particles 14 supported on the carrier 12 and formed of Pd and Ni and is manufactured by a manufacturing method different from that of the nanocomposite metal material 10B that is a nanocomposite metal material 10 containing Pd.

The method for manufacturing a nanocomposite metal material 10D includes a hydrogen absorption step and a heating step.

The hydrogen absorption step in the method for manufacturing a nanocomposite metal material 10D is a step of supplying hydrogen gas to fine metal particles 20B at room temperature. Hydrogen is absorbed in the fine metal particles 20B, a heat generation treatment is performed for 3 days or longer and 7 days or shorter under a temperature rising condition of 250° C. or higher and 350° C. or lower, and then heating is performed under vacuum. The fine metal particles 20B are the same as described above. The absorption of hydrogen in the fine metal particles 20B is realized by supplying hydrogen gas to the fine metal particles 20B disposed in the reaction furnace in a vacuum state. The hydrogen gas to be supplied may be either deuterium gas or light hydrogen gas.

The heating step in the method for manufacturing a nanocomposite metal material 10D is a step of heating the fine metal particles 20B in which the hydrogen is absorbed to 200° C. or higher and 450° C. or lower under a vacuum state to obtain a nanocomposite metal material 10D.

A temperature range in the heating step is preferably a range of 200° C. or higher and 450° C. or lower, and may be a range of 300° C. or higher and 450° C. or lower or a range of 350° C. or higher and 450° C. or lower. Specifically, the temperature range in the heating step (baking) may be within a range in which a material temperature distribution during the heating is a minimum of 200° C. or higher and 250° C. or lower and a maximum of 350° C. or higher and 450° C. or lower.

In addition, the heating time in the heating step may be adjusted according to the heating temperature (from 250° C. to 450° C.) and the like. For example, in the case of the condition of 300° C., the heating time is preferably in a range of 24 hours or longer and 64 hours or shorter and most preferably in a range of 48 hours or longer and 64 hours or shorter.

It is considered that the following phenomenon occurs by the hydrogen absorption step and the heating step.

It is considered that when the fine metal particles 20B are heated in the heating step, a step of desorbing at least a part of the absorbed hydrogen and a step of absorbing hydrogen from the outside compete with each other on the surface of the Ni core. It is considered that at least a part of the absorbed hydrogen is desorbed by heating the fine metal particles 20B in the heating step. It is theoretically presumed that heat generation sites due to hydrogen clusters are formed on the surfaces of the Pd complete shell and the Ni core. It is presumed that an increase in the number of heat generation sites is caused by the baking and re-firing of the nanocomposite metal material, which increases excessive heat power induced by the hydrogen clusters.

Note that, similarly to the nanocomposite metal material 10C, the heating step in the manufacturing of the nanocomposite metal material 10D is preferably performed a plurality of times. Note that the definition of the plurality of heating steps is the same as described above.

In the first heating step, it is considered that phenomena such as evaporation of moisture in the fine metal particles 20B in which the hydrogen is absorbed and generation of impurity gas (nitrogen and the like) from the fine metal particles 20B occur. Therefore, it is preferable to use the nanocomposite metal material 10 manufactured by performing the heating step twice or more as the nanocomposite metal material 10D.

For example, the nanocomposite metal material 10D is manufactured through the hydrogen absorption step and the heating step using a thermal reactor. For example, the thermal reactor 30 is used for manufacturing the nanocomposite metal material 10D (see FIG. 3).

In a case where the nanocomposite metal material 10D is manufactured using the thermal reactor 30, for example, the following method is used.

For example, first, a hydrogen absorption step is performed. In the hydrogen absorption step, first, the fine metal particles 20B are supplied into the reaction furnace 32, and then, the vacuum mechanism 36 is driven by control of the control unit 50 to bring the inside of the reaction furnace 32 into a vacuum state. Then, hydrogen gas is supplied into the reaction furnace 32 while maintaining the vacuum state. The hydrogen gas is supplied by control of the control unit 50.

The hydrogen gas is supplied into the reaction furnace 32, such that hydrogen is absorbed in the fine metal particles 20B.

Next, a heating step is performed. In the heating step, the supply of the hydrogen gas into the reaction furnace 32 is stopped. Then, the heating mechanism 38 is controlled while maintaining the hydrogen gas state of the inside of the reaction furnace 32, such that the inside of the reaction furnace 32 is heated to 200° C. or higher and 300° C. or lower. The heating mechanism 38 is controlled by the control unit 50. By this heating step, the nanocomposite metal material 10D is manufactured.

In a composition of the nanocomposite metal material 10D, a ratio of the number of atoms of Pd to Ni (Pd:Ni) is in a range of 1:7 or more and 1:15 or less, and a ratio of the number of atoms of Ni to Zr is in a range of 1:2 or more and 1:4 or less.

Note that the composition of the nanocomposite metal material 10D is preferably in the above range, and the ratio of the number of atoms of Pd to Ni (Pd:Ni) is more preferably in a range of 1:7 or more and 1:12 or less. In addition, the ratio of the number of atoms of Ni to Zr may be in a range of 1:2 or more and 1:3 or less or in a range of 1:2 or more and 1:2.5 or less.

The composition of the nanocomposite metal material 10D is adjusted by controlling an atomic ratio (mass ratio) in the Pd—Ni—Zr alloy, which is the amount charged at the time of producing the fine metal particles 20B.

<Nanocomposite Metal Material 10E>

Next, the nanocomposite metal material 10E and the method for manufacturing a nanocomposite metal material 10E will be described.

The nanocomposite metal material 10E is a nanocomposite metal material 10 that includes a carrier 12 formed of ceramic and two-element metal particles 14 supported on the carrier 12 and formed of Cu and Ni and is manufactured by a manufacturing method different from those of the nanocomposite metal material 10A and the nanocomposite metal material 10C that are the nanocomposite metal materials 10 containing Cu.

The method for manufacturing a nanocomposite metal material 10E includes a firing step of firing fine metal particles 20A obtained by pulverizing an amorphous metal 18 composed of Cu, Ni, and ceramic at 300° C. or higher and 600° C. or lower, a hydrogen absorption step of absorbing hydrogen in the fired fine metal particles 20A by supplying hydrogen gas to the fired fine metal particles 20A, and a heating step of heating the fine metal particles 20A in which the hydrogen is absorbed to 200° C. or higher and 300° C. or lower under a vacuum state to obtain a nanocomposite metal material 10E.

That is, the method for manufacturing a nanocomposite metal material 10E corresponds to the method for manufacturing a nanocomposite metal material 10C using the nanocomposite metal material 10A obtained by the method for manufacturing a nanocomposite metal material 10A as the fine metal particles 20A.

Therefore, the firing step in the method for manufacturing a nanocomposite metal material 10E is similar to the firing step in the method for manufacturing a nanocomposite metal material 10A.

In addition, the hydrogen absorption step and the heating step in the method for manufacturing a nanocomposite metal material 10E are similar to the hydrogen absorption step and the heating step of the method for manufacturing a nanocomposite metal material 10C, except that the nanocomposite metal material 10A obtained by the firing step is used instead of the fine metal particles 20A in the hydrogen absorption step.

In a composition of the nanocomposite metal material 10E, in a case where the carrier 12 is formed of Zr that is ceramic, a ratio of the number of atoms of Cu to Ni (Cu:Ni) is in a range of 1:7 or more and 1:15 or less, and a ratio of the number of atoms of Ni to Zr is in a range of 1:2 or more and 1:4 or less.

Note that the composition of the nanocomposite metal material 10E is more preferably in the above range, and the ratio of the number of atoms of Cu to Ni (Cu:Ni) is preferably in a range of 1:7 or more and 1:12 or less. In addition, the ratio of the number of atoms of Ni to Zr may be in a range of 1:2 or more and 1:3 or less or in a range of 1:2 or more and 1:2.5 or less.

The composition of the nanocomposite metal material 10E is adjusted by controlling an atomic ratio (mass ratio) in the Cu—Ni—Zr alloy, which is the amount charged at the time of producing the fine metal particles 20A.

<Nanocomposite Metal Material 10F>

Next, the nanocomposite metal material 10F and the method for manufacturing a nanocomposite metal material 10F will be described.

The nanocomposite metal material 10F is a nanocomposite metal material 10 that includes a carrier 12 formed of ceramic and two-element metal particles 14 supported on the carrier 12 and formed of Pd and Ni and is manufactured by a manufacturing method different from those of the nanocomposite metal material 10B and the nanocomposite metal material 10D that are nanocomposite metal materials 10 containing Pd.

The method for manufacturing a nanocomposite metal material 10F includes a firing step of firing fine metal particles 20B obtained by pulverizing an amorphous metal 18 composed of Pd, Ni, and ceramic at 300° C. or higher and 600° C. or lower, a hydrogen absorption step of absorbing hydrogen in the fired fine metal particles 20B by supplying hydrogen gas to the fired fine metal particles 20B, and a heating step of heating the fine metal particles 20B in which the hydrogen is absorbed to 200° C. or higher and 300° C. or lower under a vacuum state to obtain a nanocomposite metal material 10F.

That is, the method for manufacturing a nanocomposite metal material 10F corresponds to the method for manufacturing a nanocomposite metal material 10D using the nanocomposite metal material 10B obtained by the method for manufacturing a nanocomposite metal material 10B as the fine metal particles 20B.

Therefore, the firing step in the method for manufacturing a nanocomposite metal material 10F is similar to the firing step in the method for manufacturing a nanocomposite metal material 10B.

In addition, the hydrogen absorption step and the heating step in the method for manufacturing a nanocomposite metal material 10F are similar to the hydrogen absorption step and the heating step of the method for manufacturing a nanocomposite metal material 10D, except that the nanocomposite metal material 10B obtained by the firing step is used instead of the fine metal particles 20B in the hydrogen absorption step.

In a composition of the nanocomposite metal material 10F, in a case where the carrier 12 is formed of Zr that is ceramic, a ratio of the number of atoms of Pd to Ni (Pd:Ni) is in a range of 1:7 or more and 1:15 or less, and a ratio of the number of atoms of Ni to Zr is in a range of 1:2 or more and 1:4 or less.

Note that the composition of the nanocomposite metal material 10F is preferably in the above range, and the ratio of the number of atoms of Pd to Ni (Pd:Ni) is more preferably in a range of 1:7 or more and 1:12 or less. In addition, the ratio of the number of atoms of Ni to Zr may be in a range of 1:2 or more and 1:3 or less or in a range of 1:2 or more and 1:2.5 or less.

The composition of the nanocomposite metal material 10F is adjusted by controlling an atomic ratio (mass ratio) in the Pd—Ni—Zr alloy, which is the amount charged at the time of producing the fine metal particles 20A.

<Reaction Step>

Next, an exothermic reaction between the nanocomposite metal material 10 (the nanocomposite metal materials 10A to 10F) manufactured above and hydrogen will be described.

The nanocomposite metal material 10 is disposed in the reaction furnace, the inside of the reaction furnace is brought into a vacuum state, and hydrogen gas is supplied into the reaction furnace. The hydrogen gas to be supplied may be either deuterium gas or light hydrogen gas. Then, the inside of the reaction furnace is heated so as to be in a range of 250°

C. or higher and 450° C. or lower, specifically, so that the material temperature distribution during heating is a minimum of 200 to 250° C. and a maximum of 350 to 450° C. Then, an exothermic phenomenon due to the exothermic reaction between the nanocomposite metal material 10 and hydrogen occurs. The exothermic phenomenon may be referred to as an abnormal heat generation phenomenon.

It has become clear that the nanocomposite metal material 10 of the present embodiment can realize an increase in calorific value of the heat generation phenomenon as compared with a conventional composite metal material manufactured by a manufacturing method other than the manufacturing method described above.

The reason that the effects are exhibited is not clear, but is assumed as follows. However, the present invention is not limited by the following presumption. It is presumed that the number of sites of nanocatalyst dent structures (called sub-nanopores in a theoretical model) formed on the surface of the incomplete shell-Ni core that is either of Cu—Ni and Pd—Ni is greatly increased by the treatment of combining re-firing and baking of the present embodiment, and the exothermic reaction induced by the hydrogen clusters formed at the site is greatly increased under a dynamic balance of desorption and absorption of hydrogen under a temperature rise. It is considered that the calorific value can be increased by such a mechanism.

<Nanocomposite Metal Material 10G>

Next, the nanocomposite metal material 10G and the method for manufacturing a nanocomposite metal material 10G will be described.

The nanocomposite metal material 10G is a nanocomposite metal material 10 that includes a carrier 12 formed of ceramic and two-element metal particles 14 supported on the carrier 12 and formed of Cu and Ni and is manufactured by a manufacturing method different from those of the nanocomposite metal material 10A, the nanocomposite metal material 10C, and the nanocomposite metal material 10E that are the nanocomposite metal materials 10 containing Cu.

The method for manufacturing a nanocomposite metal material 10G uses fine metal particles 20A as a starting material, and includes a heating step, a hydrogen absorption step, a reaction step, and a re-firing step.

The heating step included in the method for manufacturing a nanocomposite metal material 10G is a step similar to the heating step used in the methods for manufacturing a nanocomposite metal material 10C and a nanocomposite metal material 10E described above, and any condition can be selected from the conditions of the heating step described above.

The hydrogen absorption step included in the method for manufacturing a nanocomposite metal material 10G is a step similar to the hydrogen absorption step used in the methods for manufacturing a nanocomposite metal material 10C and a nanocomposite metal material 10E described above, and any condition can be selected from the conditions of the hydrogen absorption step described above.

The reaction step included in the method for manufacturing a nanocomposite metal material 10G is a step similar to the reaction step in which the exothermic reaction between each of the nanocomposite metal material 10A to the nanocomposite metal material 10F and hydrogen is performed described above, and any condition can be selected from the conditions of the reaction step described above.

The re-firing step included in the method for manufacturing a nanocomposite metal material 10G is a step similar to the re-firing step used in the method for manufacturing a nanocomposite metal material 10A described above, and any condition can be selected from the conditions of the re-firing step described above. However, the re-firing step for the nanocomposite metal material 10G is a firing step performed after the hydrogen absorption step, the heating step, and the reaction step, and is distinguished from the firing step for manufacturing the nanocomposite metal material 10A from the fine metal particles 20A described above.

Figure 4:
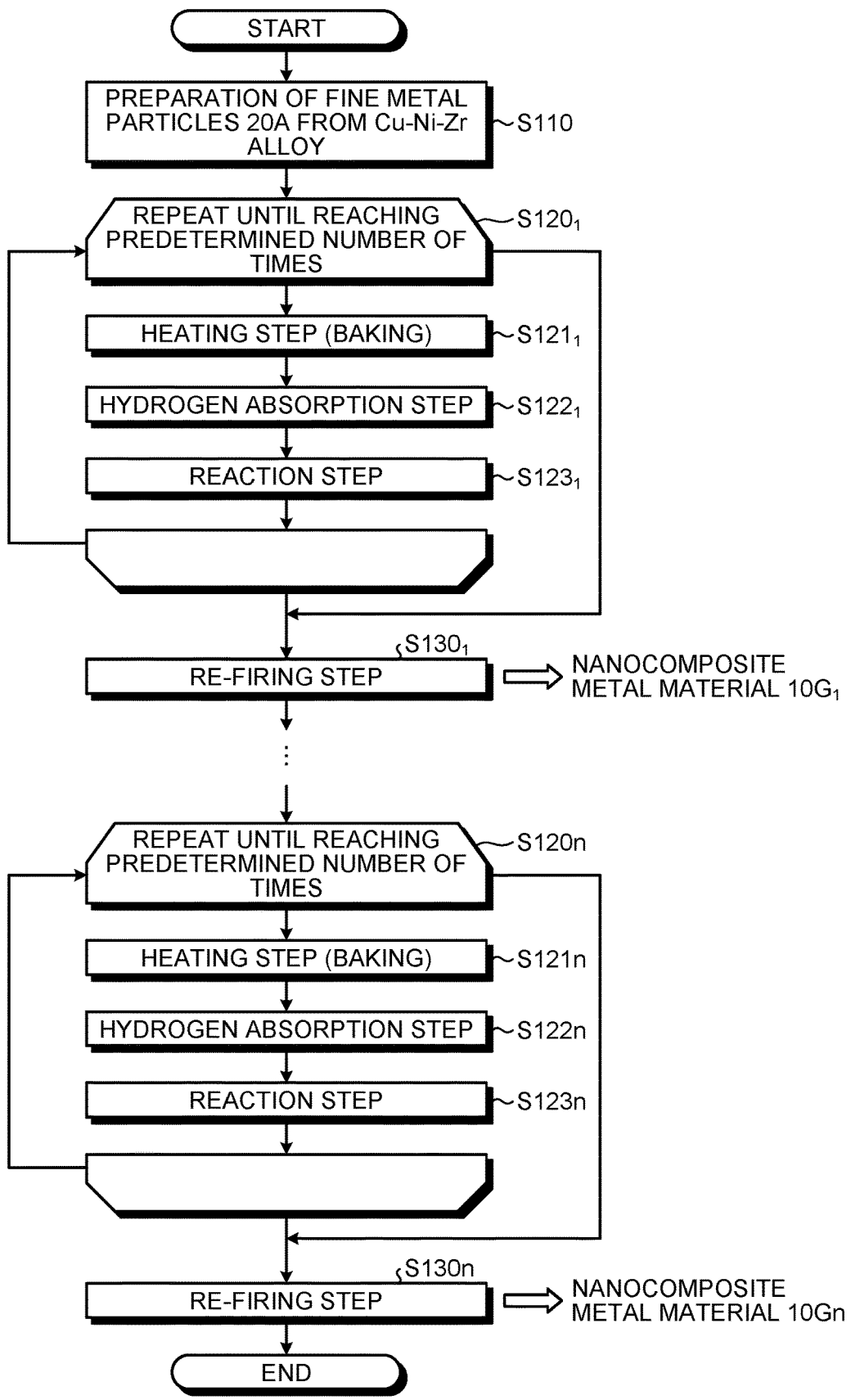
FIG. 4 is a flow diagram illustrating an example of a procedure of a method for manufacturing a nanocomposite metal material according to the embodiment.

The method for manufacturing a nanocomposite metal material 10G will be described with reference to FIG. 4. FIG. 4 is a flow diagram illustrating an example of a procedure of the method for manufacturing a nanocomposite metal material 10G according to the embodiment.

As illustrated in FIG. 4, fine metal particles 20A are prepared from a Cu—Ni—Zr alloy using the method described above (Step S110).

Next, a heating step (baking) (Step $S121_1$), a hydrogen absorption step (Step $S122_1$), and a reaction step (Step $S123_1$) are repeatedly performed in this order on the fine metal particles 20A until reaching a predetermined number of times (Step $S120_1$). The number of times of performing these steps can be one or more.

Next, a re-firing step is performed on the fine metal particles 20A (Step $S130_1$). At this time, the fine metal particles 20A are taken out from the reaction furnace used in the above step, and the fine metal particles 20A are subjected to re-firing in another system. Therefore, a calorific value obtained from the nanocomposite metal material 10G is dramatically increased.

As described above, a nanocomposite metal material $10G_1$ is manufactured by the processing up to Step $S130_1$. Note that the processing of Step S120 (Steps S121 to S123) and Step S130 is set as one cycle, and these processing can be repeated a plurality of times.

A nanocomposite metal material 10 obtained by executing the processing of Step S120 and Step S130 once is referred to as the nanocomposite metal material $10G_1$ as described above. A nanocomposite metal material 10 obtained by executing the processing of Step S120 and Step S130 twice is referred to as a nanocomposite metal material $10G_2$. As illustrated in FIG. 4, a nanocomposite metal material subjected up to the $n^{th}$ processing of Step S120n (Steps S121n to S123n) and Step S130n is referred to as a nanocomposite metal material 10Gn. As the n number of nanocomposite metal materials 10Gn is increased, that is, as the number of times of the re-firing steps after performing the hydrogen absorption step, the heating step, and the reaction step is increased, a calorific value obtained from the nanocomposite metal material 10Gn tends to be increased.

<Nanocomposite Metal Material 10H>

Next, the nanocomposite metal material 10H and the method for manufacturing a nanocomposite metal material 10H will be described.

The nanocomposite metal material 10H is a nanocomposite metal material 10 that includes a carrier 12 formed of ceramic and two-element metal particles 14 supported on the carrier 12 and formed of Pd and Ni and is manufactured by a manufacturing method different from those of the nanocomposite metal material 10B, the nanocomposite metal material 10D, and the nanocomposite metal material 10F that are the nanocomposite metal materials 10 containing Pd.

The method for manufacturing a nanocomposite metal material 10H uses fine metal particles 20B as a starting material, and includes a heating step, a hydrogen absorption step, a reaction step, and a re-firing step.

The heating step included in the method for manufacturing a nanocomposite metal material 10H is a step similar to the heating step used in the methods for manufacturing a nanocomposite metal material 10D and a nanocomposite metal material 10F described above, and any condition can be selected from the conditions of the heating step described above.

The hydrogen absorption step included in the method for manufacturing a nanocomposite metal material 10H is a step similar to the hydrogen absorption step used in the methods for manufacturing a nanocomposite metal material 10D and a nanocomposite metal material 10F described above, and any condition can be selected from the conditions of the hydrogen absorption step described above.

The reaction step included in the method for manufacturing a nanocomposite metal material 10H is a step similar to the reaction step in which the exothermic reaction between each of the nanocomposite metal material 10A to the nanocomposite metal material 10F and hydrogen is performed described above, and any condition can be selected from the conditions of the reaction step described above.

The re-firing step included in the method for manufacturing a nanocomposite metal material 10H is a step similar to the re-firing step used in the method for manufacturing a nanocomposite metal material 10B described above, and any condition can be selected from the conditions of the re-firing step described above. However, the re-firing step for the nanocomposite metal material 10H is a firing step performed after the hydrogen absorption step, the heating step, and the reaction step, and is distinguished from the firing step for manufacturing the nanocomposite metal material 10B from the fine metal particles 20B described above.

Figure 5:
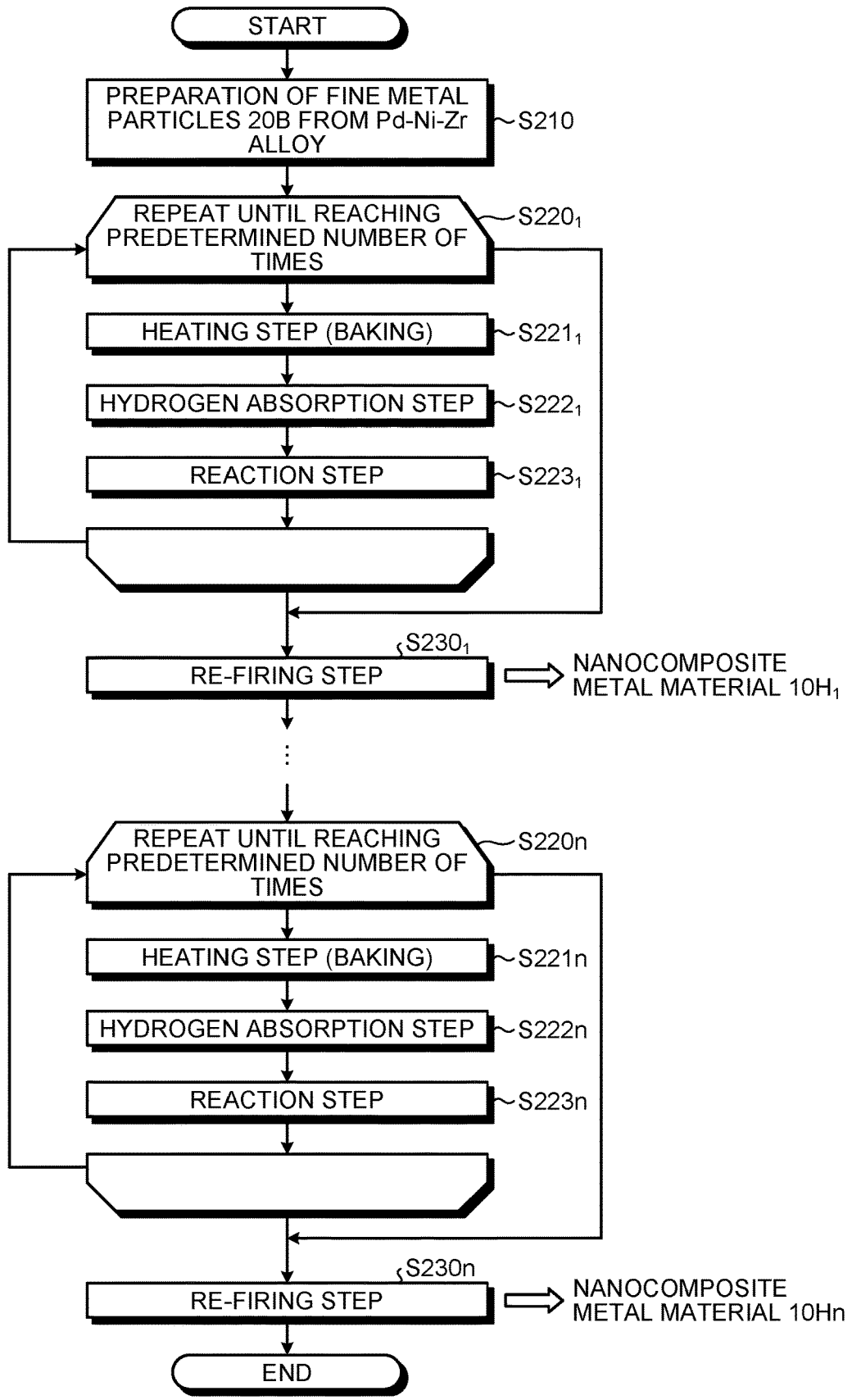
FIG. 5 is a flow diagram illustrating an example of a procedure of a method for manufacturing a nanocomposite metal material according to the embodiment.

The method for manufacturing a nanocomposite metal material 10H will be described with reference to FIG. 5. FIG. 5 is a flow diagram illustrating an example of a procedure of the method for manufacturing a nanocomposite metal material 10H according to the embodiment.

As illustrated in FIG. 5, fine metal particles 20B are prepared from a Pd—Ni—Zr alloy using the method described above (Step S210).

Next, a heating step (baking) (Step $S221_1$), a hydrogen absorption step (Step $S222_1$), and a reaction step (Step $S223_1$) are repeatedly performed in this order on the fine metal particles 20B until reaching a predetermined number of times (Step $S220_1$). The number of times of performing these steps can be one or more.

Next, a re-firing step is performed on the fine metal particles 20B (Step $S230_1$). At this time, the fine metal particles 20B are taken out from the reaction furnace used in the above step, and the fine metal particles 20B are subjected to re-firing in another system. Therefore, a calorific value obtained from the nanocomposite metal material 10H is dramatically increased.

As described above, a nanocomposite metal material $10H_1$ is manufactured by the processing up to Step $S230_1$. Note that the processing of Step S220 (Steps S221 to S223) and Step S230 is set as one cycle, and these processing can be repeated a plurality of times.

A nanocomposite metal material 10 obtained by executing the processing of Step S220 and Step S230 once is referred to as the nanocomposite metal material $10H_1$ as described above. A nanocomposite metal material 10 obtained by executing the processing of Step S220 and Step S230 twice is referred to as a nanocomposite metal material $10H_2$. As illustrated in FIG. 5, a nanocomposite metal material subjected up to the $n^{th}$ processing of Step S220n (Steps S221n to S223n) and Step S230n is referred to as a nanocomposite metal material 10Hn. As the n number of nanocomposite metal materials 10Hn is increased, that is, as the number of times of the re-firing steps after performing the hydrogen absorption step, the heating step, and the reaction step is increased, a calorific value obtained from the nanocomposite metal material 10Hn tends to be increased.

Examples

Hereinafter, the present invention will be specifically described with reference to Examples, but the present invention is not limited to these Examples.

<Preparation of Fine Metal Particles 20>

The following fine metal particles 20 (the fine metal particles 20A and the fine metal particles 20B) were prepared.

Fine metal particles 20A: CNZ7
Fine metal particles 20B: PNZ10

[Fine Metal Particles 20A: CNZ7]

CNZ7 is an example of the fine metal particle 20A prepared using a Cu—Ni—Zr alloy. A ratio of the number of atoms in CNZ7 was Cu:Ni:Zr=1:7:14.

CNZ7 was prepared as follows.

Specifically, a Cu—Ni—Zr alloy having a ratio of the number of atoms of Cu:Ni:Zr=1:7:14 was melted by being heated in the heating furnace 22A (see FIG. 2), and the melted liquid was supplied to the rotating cooling roll 22B. The melted liquid was solidified by coming into contact with the rotating cooling roll 22B to prepare a ribbon-shaped amorphous metal 18. A thickness of the ribbon-shaped amorphous metal 18 was 10 µm or more and 20 µm or less.

Then, 1,000 g of the amorphous metal 18 was injected into the crucible 24 and heating was performed in the atmosphere at a temperature of 450° C. for 120 hours. Then, the heated amorphous metal 18 was pulverized using an automatic mortar to prepare CNZ7 as an example of the fine metal particle 20A. As a result of measuring a volume average particle size of CNZ7 with an optical microscope with a resolution of 0.01 mm, the volume average particle size of CNZ7 was 0.1 mm to 0.2 mm or less. In addition, as a result of measuring a weight increase rate after firing, a degree of oxidation of CNZ7 was 31%.

[Fine Metal Particles 20B: PNZ10]

PNZ10 is an example of the fine metal particle 20B prepared using a Pd—Ni—Zr alloy. A ratio of the number of atoms in PNZ10 was Pd:Ni:Zr=1:10:20.

PNZ10 was prepared as follows.

Specifically, a Pd:Ni:Zr alloy having a ratio of the number of atoms of Pd:Ni:Zr=1:10:20 was melted by being heated in the heating furnace 22A (see FIG. 2), and the melted liquid was supplied to the rotating cooling roll 22B. The melted liquid was solidified by coming into contact with the rotating cooling roll 22B to prepare a ribbon-shaped amorphous metal 18. A thickness of the ribbon-shaped amorphous metal 18 was 10 µm or more and 50 µm or less.

Then, 1,000 g of the amorphous metal 18 was injected into the crucible 24 and heating was performed in the atmosphere at a temperature of 450° C. for 80 hours. Then, the heated amorphous metal 18 was pulverized using an automatic mortar to prepare PNZ10 as an example of the fine metal particle 20B. As a result of measuring a volume average particle size of PNZ10 with an optical microscope with a resolution of 0.01 mm, the volume average particle size of PNZ10 was 0.05 mm or more and 0.1 mm or less. In addition, as a result of measuring a degree of oxidation of PNZ10 at a weight increase rate after firing, the degree of oxidation of PNZ10 was 2.44%.

<Production of Nanocomposite Metal Material 10>

As a nanocomposite metal material 10A to a nanocomposite metal material 10H, the following nanocomposite metal materials 10 were produced.

Nanocomposite metal material 10A: CNZ7r
Nanocomposite metal material 10B: PNZ10r
Nanocomposite metal material 10C: CNZ7 #1-1 and CNZ7 #2-1
Nanocomposite metal material 10D: PNZ10 #1-1 and PNZ10 #2-1
Nanocomposite metal material 10E: CNZ7r #1-1, CNZ7r #1-2, CNZ7r #2-1, CNZ7r #2-2, and CNZ7r #2-4
Nanocomposite metal material 10F: PNZ10r #1-1, PNZ10r #1-4, PNZ10r #2-1, and PNZ10r #2-2
Nanocomposite metal material 10G: CNZ7R, CNZ7RR, and CNZ7RRR
Nanocomposite metal material 10H: PNZ10R, PNZ10RR, and PNZ10RRR

[Nanocomposite Metal Material 10A: CNZ7r]

CNZ7r is an example of the nanocomposite metal material 10A produced using CNZ7 (the fine metal particles 20A) prepared above. The lower case "r" means that the firing step of the nanocomposite metal material 10A was performed once.

CNZ7r was produced as follows.

1,000 g of CNZ7 (the fine metal particles 20A) prepared above was injected into the electrical furnace (the reaction furnace 32), and firing was performed in the atmosphere at 450° C. for 120 hours. CNZ7r (nanocomposite metal material 10A) was produced by this firing step.

Figure 6:
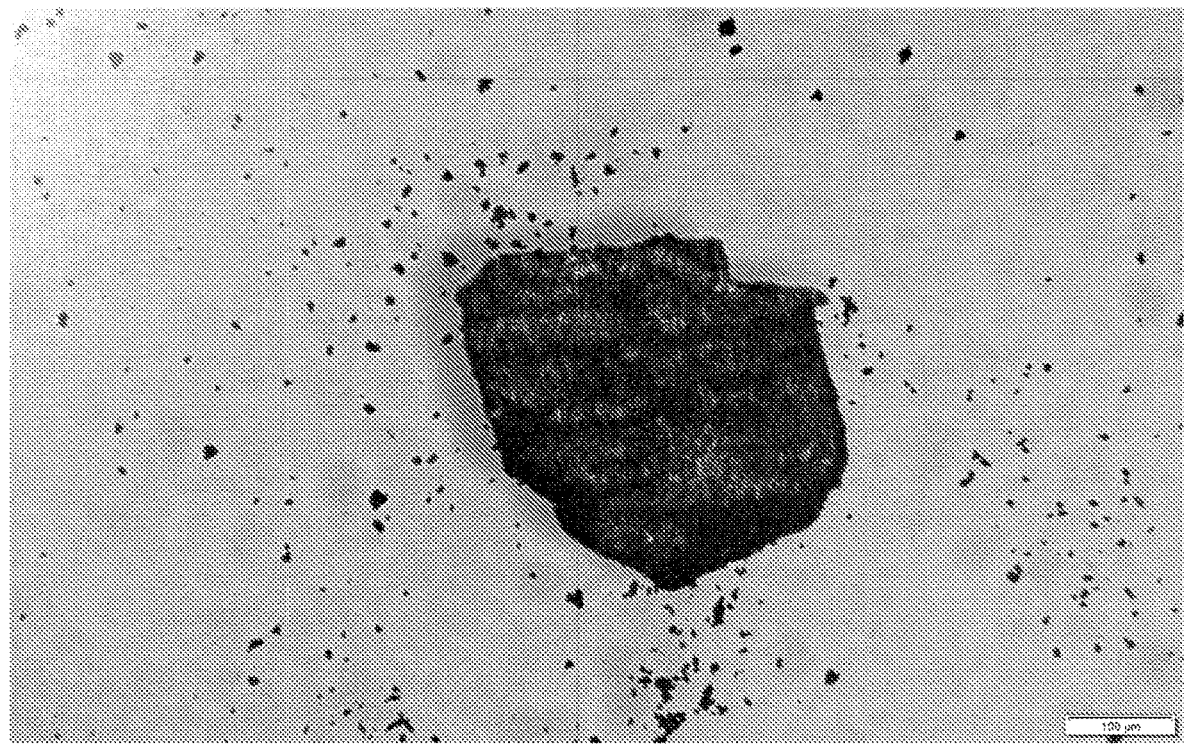
FIG. 6 is an electron micrograph of CNZ7r according to Example.

FIG. 6 is an electron micrograph of CNZ7r. A ratio of the number of atoms in CNZ7r was Cu:Ni:Zr=1:7:14, which was the same as that of the initial amorphous ribbon after melt spinning. In addition, as a result of measuring a volume average particle size of CNZ7r (the nanocomposite metal material 10A) by the method described above, the volume average particle size of CNZ7r was 0.1 mm or more and 1 mm or less. In addition, as a result of measuring a degree of oxidation of the carrier 12 formed of Zr in CNZ7r by the method described above, the degree of oxidation of the carrier 12 was 35.6% in terms of weight ratio.

[Nanocomposite Metal Material 10B: PNZ10r]

PNZ10r is an example of the nanocomposite metal material 10B produced using PNZ10r (the fine metal particles 20B) prepared above. The lower case "r" means that the firing step of the nanocomposite metal material 10B was performed once.

PNZ10r was produced as follows.

600 g of PNZ10r (the fine metal particles 20B) prepared above was injected into the electrical furnace (the reaction furnace 32), and firing was performed in the atmosphere at 450° C. for 120 hours. PNZ10r (nanocomposite metal material 10B) was produced by this firing step.

A ratio of the number of atoms in PNZ10r was Pd:Ni:Zr=1:10:20, which was the same as that of the initial melt-spun ribbon. In addition, as a result of measuring a volume average particle size of PNZ10r (the nanocomposite metal material 10B) by the method described above, the volume average particle size of PNZ10r was 0.05 mm or more and 1 mm or less. In addition, as a result of measuring a degree of oxidation of PNZ10r by the method described above, the degree of oxidation of PNZ10r was 14.9% in terms of weight ratio.

[Nanocomposite Metal Material 10C: CNZ7 #1-1 and CNZ7 #2-1]

As the nanocomposite metal material 10C, CNZ7 #1-1 and CNZ7 #2-1 were produced. CNZ7 #1-1 and CNZ7 #2-1 are examples of the nanocomposite metal material 10C produced using CNZ7 (the fine metal particles 20A) prepared above.

The number immediately after "#" indicates the number of times of the heating step (baking) of the nanocomposite metal material 10C. That is, #1 means that the heating step (baking) is performed once after the hydrogen absorption step. In addition, #2 means that the heating step (baking) is performed twice after the hydrogen absorption step.

CNZ7 #1-1 and CNZ7 #2-1 were produced as follows.

CNZ7 #1-1 and CNZ7 #2-1 were produced using the thermal reactor 30 illustrated in FIG. 3.

Specifically, 1,000 g of CNZ7 was supplied into the reaction furnace 32. Then, the vacuum mechanism 36 was driven by the control of the control unit 50 to bring the inside of the reaction furnace 32 into a vacuum state. Then, hydrogen gas was supplied into the reaction furnace 32 from the gas supply unit 34 in a state where the vacuum state was maintained (hydrogen absorption step). Then, after this state was maintained for 48 hours, the supply of the hydrogen gas was stopped while maintaining the hydrogen gas state of the inside of the reaction furnace 32. Then, the inside of the reaction furnace 32 was evacuated, and the reaction furnace 32 was heated by the heating mechanism 38 while maintaining the vacuum state, such that the material temperature distribution in the reaction furnace 32 was controlled in a temperature range of a minimum of 200° C. and a maximum of 450° C. or lower, and heating was performed for 64 hours (heating step (baking)). CNZ7 #1-1 was produced by this heating step.

In addition, after the heating step (baking) of heating in the above temperature range for 64 hours was performed (first baking), light hydrogen gas was charged so as to have a pressure of 0.2 MPa or more and 0.6 MPa or less, and the reaction furnace 32 was heated from 200° C. to 450° C. to perform a heating test for 2 weeks. Thereafter, the inside of the reaction furnace was switched to evacuation and a heating step (baking) of heating for 24 hours was performed (second baking) again to produce CNZ7 #2-1.

[Nanocomposite Metal Material 10D: PNZ10 #1-1 and PNZ10 #2-1]

As the nanocomposite metal material 10D, PNZ10 #1-1 and PNZ10 #2-1 were produced. PNZ10 #1-1 and PNZ10 #2-1 are examples of the nanocomposite metal material 10D produced using PNZ10 (the fine metal particles 20B) prepared above.

The number immediately after "#" indicates the number of times of the heating step (baking) of the nanocomposite metal material 10D. That is, #1 means that the heating step (baking) is performed once after the hydrogen absorption step. In addition, #2 means that the heating step (baking) is performed twice after the hydrogen absorption step.

PNZ10 #1-1 and PNZ10 #2-1 were produced using the thermal reactor 30 illustrated in FIG. 3.

Specifically, 600 g of PNZ10 was supplied into the reaction furnace 32. Then, the vacuum mechanism 36 was driven by the control of the control unit 50 to bring the inside of the reaction furnace 32 into a vacuum state. Then, hydrogen gas was supplied into the reaction furnace 32 from the gas supply unit 34 in a state where the vacuum state was maintained (hydrogen absorption step). Then, after this state was maintained for 48 hours, the supply of the hydrogen gas was stopped while maintaining the hydrogen gas state of the inside of the reaction furnace 32. Then, the inside of the reaction furnace 32 was evacuated, and the reaction furnace 32 was heated by the heating mechanism 38 while maintaining the vacuum state, such that the material temperature distribution in the reaction furnace 32 was controlled in a temperature range of a minimum of 200° C. and a maximum of 450° C. or lower, and heating was performed for 48 hours (heating step (baking)). PNZ10 #1-1 was produced by this heating step.

In addition, after hydrogen gas absorption at the room temperature, the temperature was raised to a temperature of 200° C. or higher and 450° C. or lower, and an exothermic test was performed. Thereafter, the inside of the reaction furnace was switched to evacuation, and baking was performed under the same conditions as in the first baking (second baking), thereby producing PNZ10 #2-1.

[Nanocomposite Metal Material 10E: CNZ7r #1-1, CNZ7r #1-2, CNZ7r #2-1, CNZ7r #2-2, and CNZ7r #2-4]

As the nanocomposite metal material 10E, CNZ7r #1-1, CNZ7r #1-2, CNZ7r #2-1, CNZ7r #2-2, and CNZ7r #2-4 were produced.

CNZ7r #1-1, CNZ7r #1-2, CNZ7r #2-1, CNZ7r #2-2, and CNZ7r #2-4 were examples of the nanocomposite metal material 10E produced using CNZ7 (the fine metal particles 20A) prepared above.

Similarly to the above, the number immediately after "#" indicates the number of times of the heating step (baking) of the nanocomposite metal material 10E.

CNZ7r #1-1, CNZ7r #1-2, CNZ7r #2-1, CNZ7r #2-2, and CNZ7r #2-4 were produced using the thermal reactor 30 illustrated in FIG. 3.

Specifically, 505 g of CNZ7r as the nanocomposite metal material 10A produced above was supplied into the reaction furnace 32. Then, the vacuum mechanism 36 was driven by the control of the control unit 50 to bring the inside of the reaction furnace 32 into a vacuum state. Then, hydrogen gas was supplied into the reaction furnace 32 from the gas supply unit 34 in a state where the vacuum state was maintained (hydrogen absorption step). Then, after this state was maintained for 24 hours, the supply of the hydrogen gas was stopped while maintaining the hydrogen gas state of the inside of the reaction furnace 32. Then, the reaction furnace 32 was heated by the heating mechanism 38 while maintaining the hydrogen gas state of the inside of the reaction furnace 32, such that the material temperature distribution in the reaction furnace 32 was controlled in a temperature range of a minimum of 200° C. and a maximum of 450° C. or lower, and heating was performed to perform an excessive heat measurement test for several weeks. Thereafter, the inside of the reaction furnace was switched to evacuation, and heating was performed for 24 hours (heating step (baking)). By this heating step, CNZ7r #1-2 was produced by the same step as that of CNZ7r #1-1.

In addition, the heating step of heating in the temperature range of 200° C. or higher and 350° C. or lower as the heating step (baking) in the production of CNZ7r #1-1 was performed for 24 hours (first baking). Thereafter, CNZ7r #2-1 was produced by switching the inside of the reaction furnace to evacuation and performing a heating step (baking) under the same conditions as in the first baking (second baking).

Thereafter, hydrogen gas absorption at room temperature was performed for 24 hours, and then, heating was performed at 200° C. or higher and 350° C. or lower to perform an excessive heat generation test for several days. Furthermore, the material temperature distribution during the heating was controlled to a range of a minimum of 200° C. and a maximum of 450° C. or lower, and the heating step (baking) of heating for 24 hours was performed (second baking), thereby producing CNZ7r #2-2.

[Nanocomposite Metal Material 10F: PNZ10r #1-1, PNZ10r #1-4, PNZ10r #2-1, and PNZ10r #2-2]

As the nanocomposite metal material 10F, PNZ10r #1-1, PNZ10r #1-4, PNZ10r #2-1, and PNZ10r #2-2 were produced.

PNZ10r #1-1, PNZ10r #1-4, PNZ10r #2-1, and PNZ10r #2-2 were examples of the nanocomposite metal material 10F produced using PNZ10 (the fine metal particles 20B) prepared above. Similarly to the above, the number immediately after "#" indicates the number of times of the heating step (baking) of the nanocomposite metal material 10E.

PNZ10r #1-1, PNZ10r #1-4, PNZ10r #2-1, and PNZ10r #2-2 were produced using the thermal reactor 30 illustrated in FIG. 3.

Specifically, 450 g of PNZ10r as the nanocomposite metal material 10B produced above was supplied into the reaction furnace 32. Then, the vacuum mechanism 36 was driven by the control of the control unit 50 to bring the inside of the reaction furnace 32 into a vacuum state. Then, hydrogen gas was supplied into the reaction furnace 32 from the gas supply unit 34 in a state where the vacuum state was maintained (hydrogen absorption step at room temperature). Then, after this state was maintained for 48 hours, the supply of the hydrogen gas was stopped while maintaining the state of the inside of the reaction furnace 32. Then, the reaction furnace 32 was heated to 250° C. to 350° C. by the heating mechanism 38 while maintaining the hydrogen gas state of the inside of the reaction furnace 32 to perform an excessive heat generation test for several days. Thereafter, the inside of the reaction furnace was switched to evacuation, the material temperature distribution in the reaction furnace 32 was set to a minimum of 200° C. and a maximum of 450° C. or lower, and heating was performed for 24 hours (heating step (baking)). PNZ10r #1-1 was produced by this heating step. Thereafter, hydrogen absorption (#1-2) at room temperature and temperature rise to 300° C. were performed to produce PNZ10r #1-4.

In addition, after the above excessive heat test of PNZ10r #1-4, the material temperature distribution was set to a minimum of 200° C. and a maximum of 450° C., and then the heating step of heating for 24 hours (second baking), which was the heating step (baking) in the production, was performed to produce PNZ10r #2-1. Hydrogen absorption (#2-1) at room temperature was performed, and then, a temperature rise test (#2-2) was performed at a temperature of 300° C. or higher and 350° C. or lower.

In addition, after PNZ10r #2-2 was produced, the same process of the hydrogen absorption at room temperature, the excessive heat test in which the temperature was raised to 300° C., and the baking was repeated to produce PNZ10r #3-1.

[Nanocomposite Metal Material 10G: CNZ7R, CNZ7RR, and CNZ7RRR]

As the nanocomposite metal material 10G, CNZ7R, CNZ7RR, and CNZ7RRR were produced.

CNZ7R, CNZ7RR, and CNZ7RRR were examples of the nanocomposite metal material 10G produced using CNZ7 (the fine metal particles 20A) prepared above. The upper case "R" attached after CNZ7 means the nanocomposite metal material 10G obtained by performing a re-firing step after the heating step, the hydrogen absorption step, and the reaction step once. That is, CNZ7R is an example of the nanocomposite metal material $10G_1$, CNZ7RR is an example of the nanocomposite metal material $10G_2$, and CNZ7RRR is an example of the nanocomposite metal material $10G_3$.

[Nanocomposite metal material 10H: PNZ10R, PNZ10RR, and PNZ10RRR]

As the nanocomposite metal material 10H, PNZ10R, PNZ10RR, and PNZ10RRR were produced.

PNZ10R, PNZ10RR, and PNZ10RRR were examples of the nanocomposite metal material 10H produced using PNZ10 (the fine metal particles 20B) prepared above. The upper case "R" attached after PNZ10 means the nanocomposite metal material 10H obtained by performing a re-firing step after the heating step, the hydrogen absorption step, and the reaction step once. That is, PNZ10R is an example of the nanocomposite metal material $10H_1$, PNZ10RR is an example of the nanocomposite metal material $10H_2$, and PNZ10RRR is an example of the nanocomposite metal material $10H_3$.

<Evaluation>

Hydrogen gas was supplied to each of the nanocomposite metal material 10A to the nanocomposite metal material 10H produced above, and the calorific value of the exothermic reaction with hydrogen was evaluated.

Specifically, 450 g or more and 505 g or less of each of the nanocomposite metal materials 10 produced above was disposed in the reaction furnace 32 of the thermal reactor 30 illustrated in FIG. 3, the inside of the reaction furnace 32 was brought into a vacuum state, and then, supply of deuterium gas into the reaction furnace 32 was started. Then, the inside of the reaction furnace 32 was heated to a temperature range of 250° C. or higher and 350° C. or lower by controlling the heating mechanism 38 in a state where the supply of the deuterium gas was maintained. Then, the supply of the deuterium gas and the heating of the reaction furnace 32 were continued for 150 hours or longer, and a change in calorific value by the exothermic reaction between the nanocomposite metal material 10 and hydrogen was measured.

Note that an average value of the temperature measurement results obtained by each of the temperature sensor 40A to the temperature sensor 40D that were the temperature sensors 40 installed in the reaction furnace 32 was compared with data of a calorific value correction test in which a non-heating blank sample of 1,300 g of zirconia beads was charged in the reaction furnace to obtain a calculated result, and the calculated result was measured as the amount of excessive heat power.

[Evaluation of Calorific Values of CNZ7, CNZ7r, PNZ10, and PNZ10r]

Figure 7:
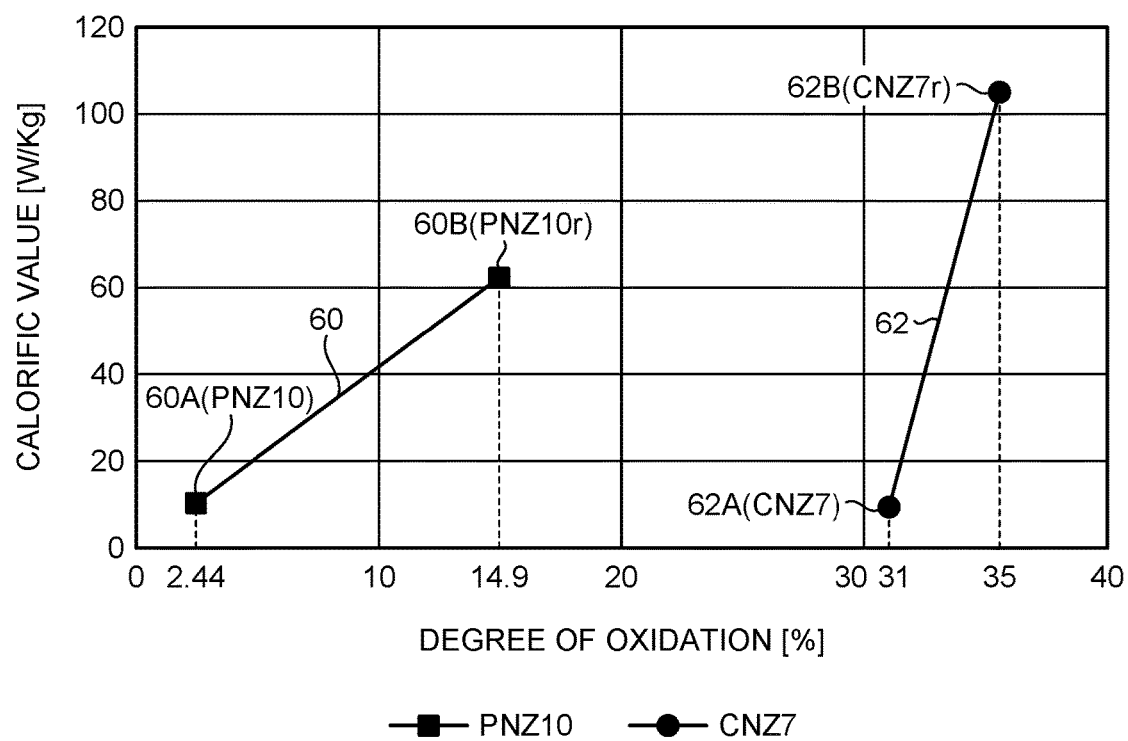
FIG. 7 is a graph illustrating measurement results showing a relationship between calorific values and degrees of oxidation of a fine metal particle and a nanocomposite metal material according to Examples.

FIG. 7 illustrates measurement results showing a relationship between calorific values and degrees of oxidation of the fine metal particle 20 and the nanocomposite metal material 10.

Note that FIG. 7 illustrates a calorific value calculated using an average value of temperature measurement results obtained by the temperature sensor 40 for several weeks from 24 hours after the start of heating the reaction furnace 32 to 300° C. and supplying deuterium gas.

FIG. 7 illustrates a line graph 60 and a line graph 62.

The line graph 60 is a line graph passing through a plot 60A and a plot 60B. The plot 60A indicates a correspondence between the degree of oxidation (2.44%) and the calorific value (10.4 W/Kg) of PNZ10 that is the fine metal particle 20B. The plot 60B indicates a relationship between the degree of oxidation (14.9%) and the calorific value (62.5 W/Kg) of PNZ10r that is the nanocomposite metal material 10B. As shown by the line graph 60, the calorific value of PNZ10r which was the nanocomposite metal material 10B was significantly increased as compared with PNZ10 which was the fine metal particle 20B.

In addition, the line graph 62 is a line graph passing through a plot 62A and a plot 62B. The plot 62A indicates a correspondence between the degree of oxidation (31%) and the calorific value (9.67 W/Kg) of CNZ7 that is the fine metal particle 20A. The plot 62B indicates a relationship between the degree of oxidation (35.6%) and the calorific value (104.9 W/Kg) of CNZ7r that is the nanocomposite metal material 10A. As shown by the line graph 62, the calorific value of CNZ7 which was the nanocomposite metal material 10A was significantly increased as compared with CNZ7 which was the fine metal particle 20A.

[Evaluation of Calorific Values of CNZ7, CNZ7 #1-1, CNZ7 #2-1, PNZ10 #1-1, PNZ10 #2-1, CNZ7r #1-1, CNZ7r #2-1, PNZ10r #1-1, and PNZ10r #2-1]

Figure 8:
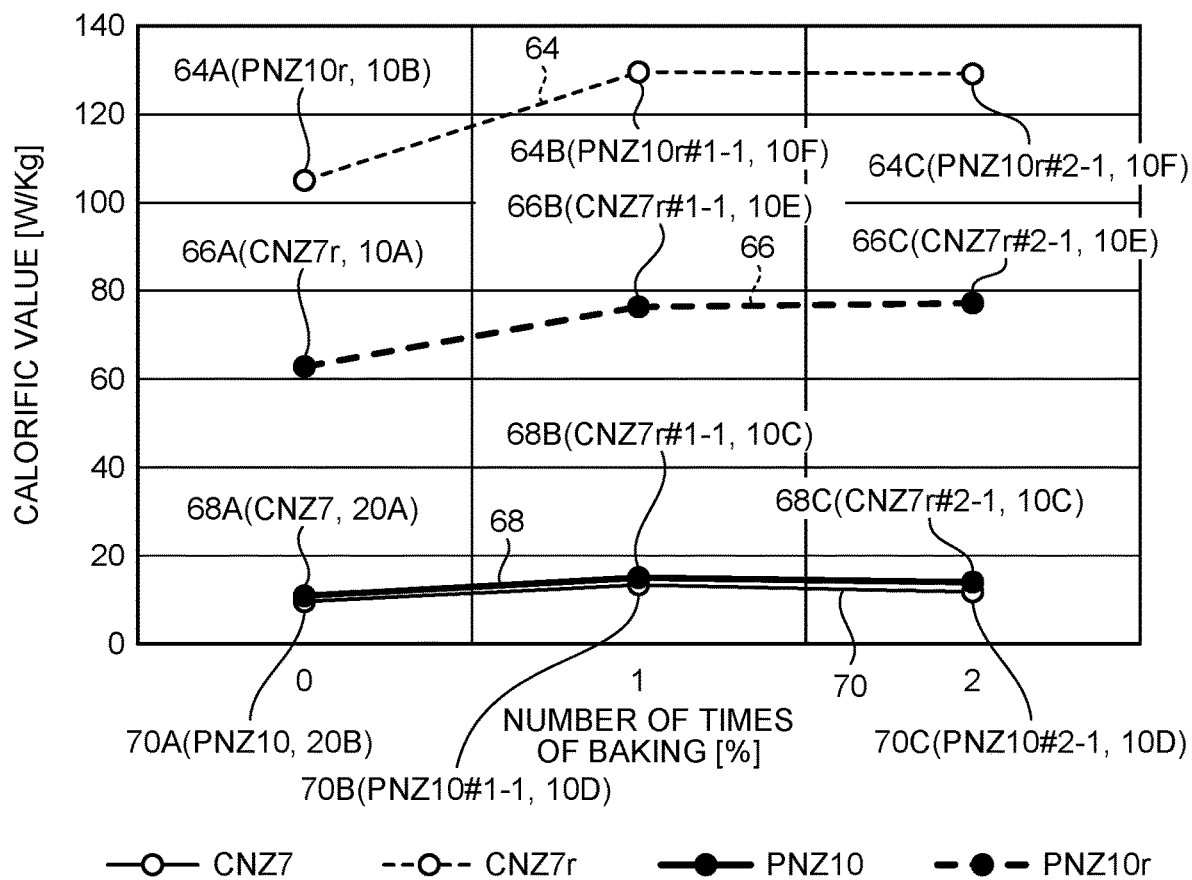
FIG. 8 is a graph illustrating measurement results showing the calorific values of the fine metal particle and the nanocomposite metal material according to Examples.

FIG. 8 illustrates measurement results showing calorific values of the fine metal particle 20 and the nanocomposite metal material 10.

Note that FIG. 8 illustrates a calorific value calculated using an average value of temperature measurement results obtained by the temperature sensor 40 for a period of several weeks from 24 hours after the start of heating the reaction furnace 32 to 300° C. and supplying deuterium gas.

A line graph 64, a line graph 66, a line graph 68, and a line graph 70 were illustrated in FIG. 8.

The line graph 70 is a line graph passing through a plot 70A, a plot 70B, and a plot 70C. The plot 70A indicates a correspondence between the number of times of baking and the calorific value of CNZ7 that is the fine metal particle 20A. The plot 70B indicates a correspondence between the number of times of baking and the calorific value of CNZ7 #1-1 that is the nanocomposite metal material 10C. The plot 70C indicates a correspondence between the number of times of baking and the calorific value of CNZ7 #2-1 that is the nanocomposite metal material 10C.

The line graph 68 is a line graph passing through a plot 68A, a plot 68B, and a plot 68C. The plot 68A indicates a correspondence between the number of times of baking and the calorific value of PNZ10 that is the fine metal particle 20B. The plot 68B indicates a correspondence between the number of times of baking and the calorific value of PNZ10 #1-1 that is the nanocomposite metal material 10D. The plot 68C indicates a correspondence between the number of times of baking and the calorific value of PNZ10 #2-1 that is the nanocomposite metal material 10D.

The line graph 66 is a line graph passing through a plot 66A, a plot 66B, and a plot 66C. The plot 66A indicates a correspondence between the number of times of baking and the calorific value of CNZ7r that is the nanocomposite metal material 10A. The plot 66B indicates a correspondence between the number of times of baking and the calorific value of CNZ7r #1-1 that is the nanocomposite metal material 10E. The plot 66C indicates a correspondence between the number of times of baking and the calorific value of CNZ7r #2-1 that is the nanocomposite metal material 10E.

The line graph 64 is a line graph passing through a plot 64A, a plot 64B, and a plot 64C. The plot 64A indicates a correspondence between the number of times of baking and the calorific value of PNZ10r that is the nanocomposite metal material 10B. The plot 64B indicates a correspondence between the number of times of baking and the calorific value of PNZ10r #1-1 that is the nanocomposite metal material 10F. The plot 64C indicates a correspondence between the number of times of baking and the calorific value of PNZ10 #r2-1 that is the nanocomposite metal material 10F.

As shown by the line graph 64, the line graph 66, the line graph 68, and the line graph 70 of FIG. 8, the calorific value was increased by performing the baking. In addition, the calorific value is increased as the number of times of baking is increased. In addition, it was confirmed that the calorific value of each of the nanocomposite metal materials 10 was increased as compared with the fine metal particle 20.

[Evaluation of Calorific Values of CNZ7r #1-2, CNZ7r #2-2, CNZ7r #2-4, PNZ10r #1-4, PNZ10r #2-1, and PNZ10r #2-2]

Figure 9:
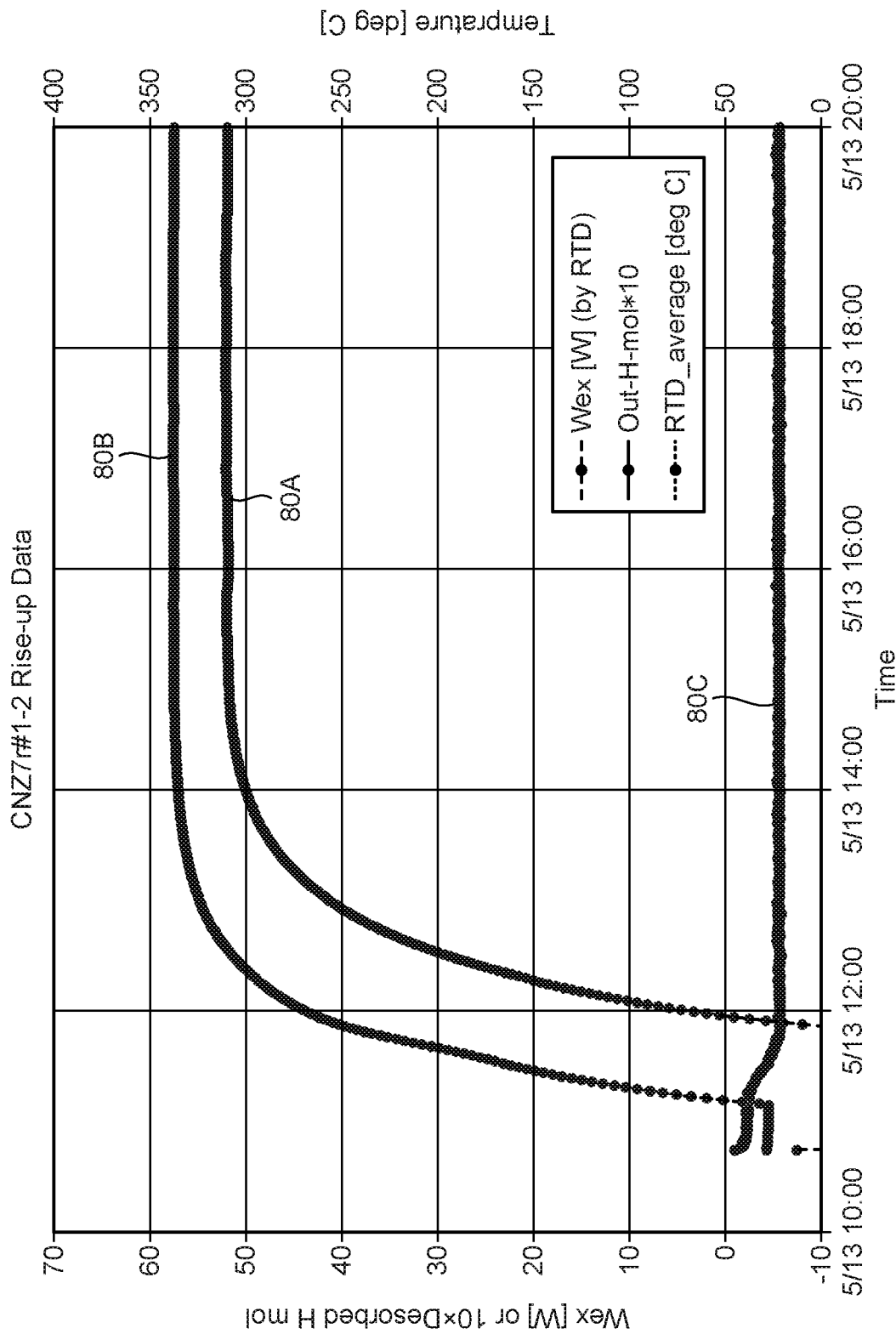
FIG. 9 is a graph illustrating a change in calorific value of CNZ7r #1-2 according to Examples.

FIG. 9 is a graph illustrating a change in calorific value of CNZ7r #1-2 that is the nanocomposite metal material 10E. A line graph 80A is a line graph showing the change in calorific value of CNZ7r #1-2. A line graph 80B is a line graph showing a transition of an average value of measurement results obtained by four temperature sensors 40 (the temperature sensor 40A to the temperature sensor 40D) in the thermal reactor 30. A line graph 80C is a line graph showing the number of moles of hydrogen atoms absorbed by the exothermic reaction.

Figure 10:
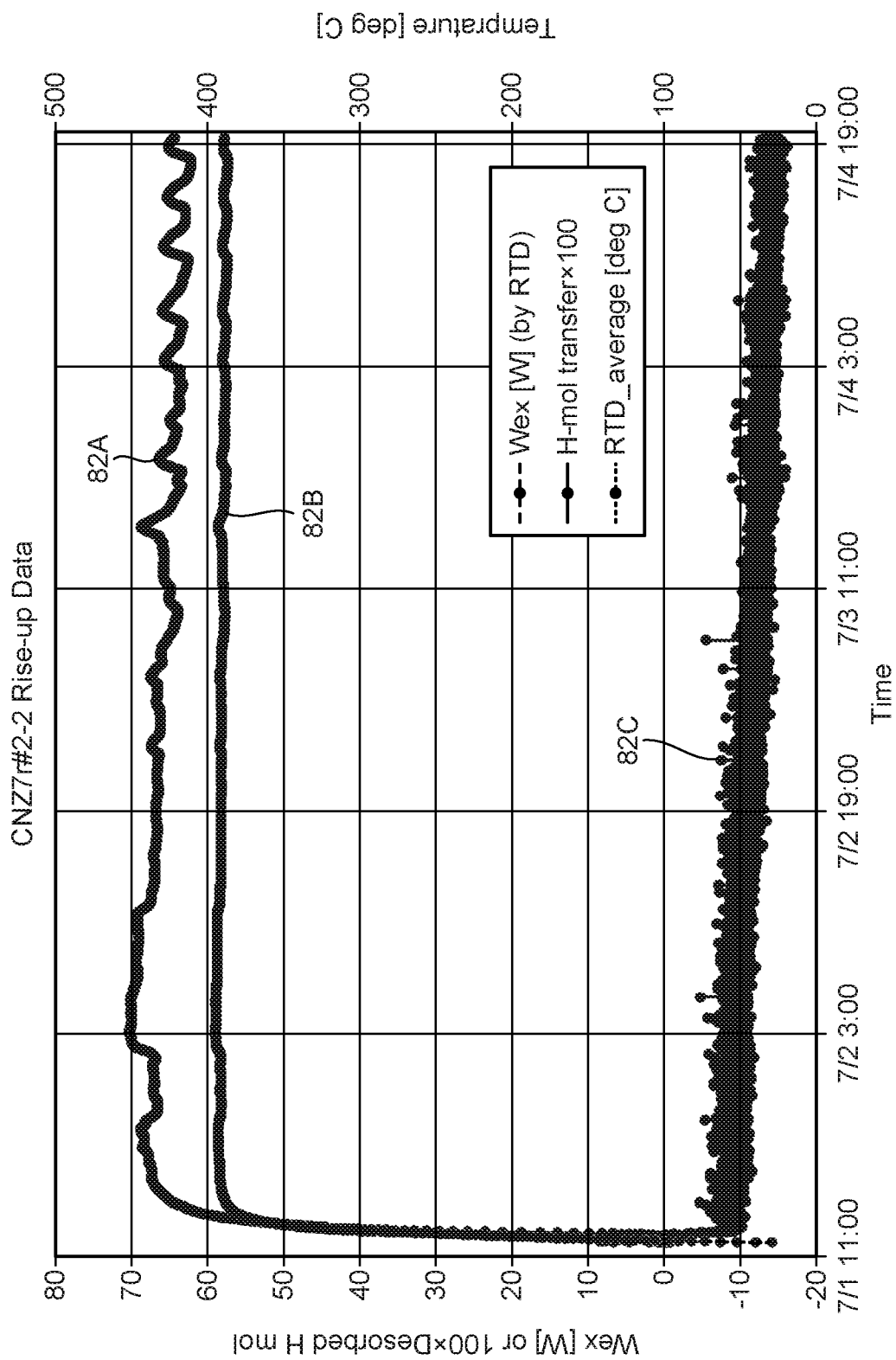
FIG. 10 is a graph illustrating a change in calorific value of CNZ7r #2-2 according to Examples.

FIG. 10 is a graph illustrating a change in calorific value of CNZ7r #2-2 that is the nanocomposite metal material 10E. A line graph 82A is a line graph showing the change in calorific value of CNZ7r #2-2. A line graph 82B is a line graph showing a transition of an average value of measurement results obtained by four temperature sensors 40 (the temperature sensor 40A to the temperature sensor 40D) in the thermal reactor 30. A line graph 82C is a line graph showing the number of moles of hydrogen atoms absorbed by the exothermic reaction.

Figure 11:
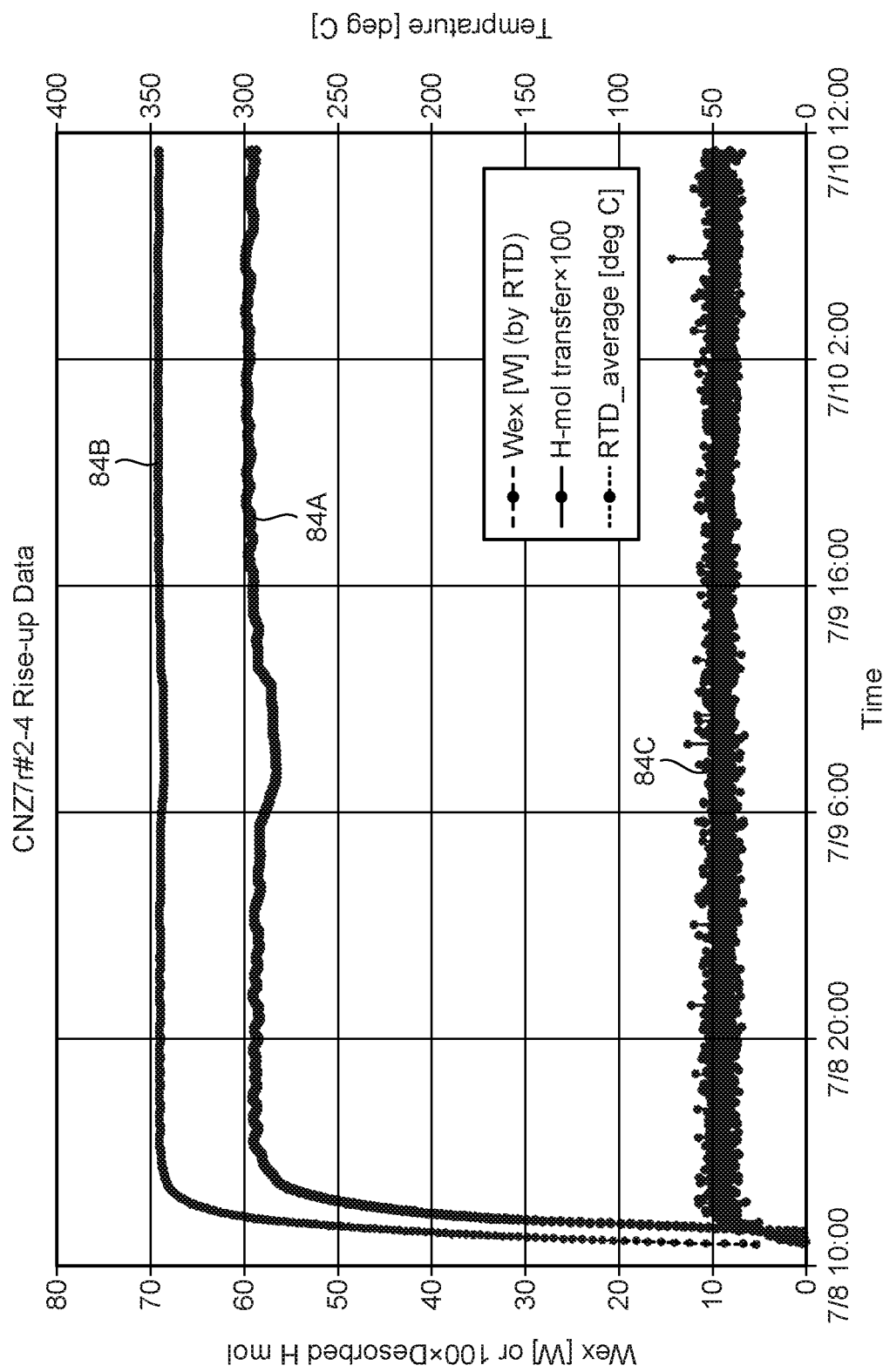
FIG. 11 is a graph illustrating a change in calorific value of CNZ7r #2-4 according to Examples.

FIG. 11 is a graph illustrating a change in calorific value of CNZ7r #2-4 that is the nanocomposite metal material 10E. A line graph 84A is a line graph showing the change in calorific value of CNZ7r #2-4. A line graph 84B is a line graph showing a transition of an average value of measurement results obtained by four temperature sensors 40 (the temperature sensor 40A to the temperature sensor 40D) in the thermal reactor 30. A line graph 84C is a line graph showing the number of moles of hydrogen atoms discharged by the exothermic reaction.

Figure 12:
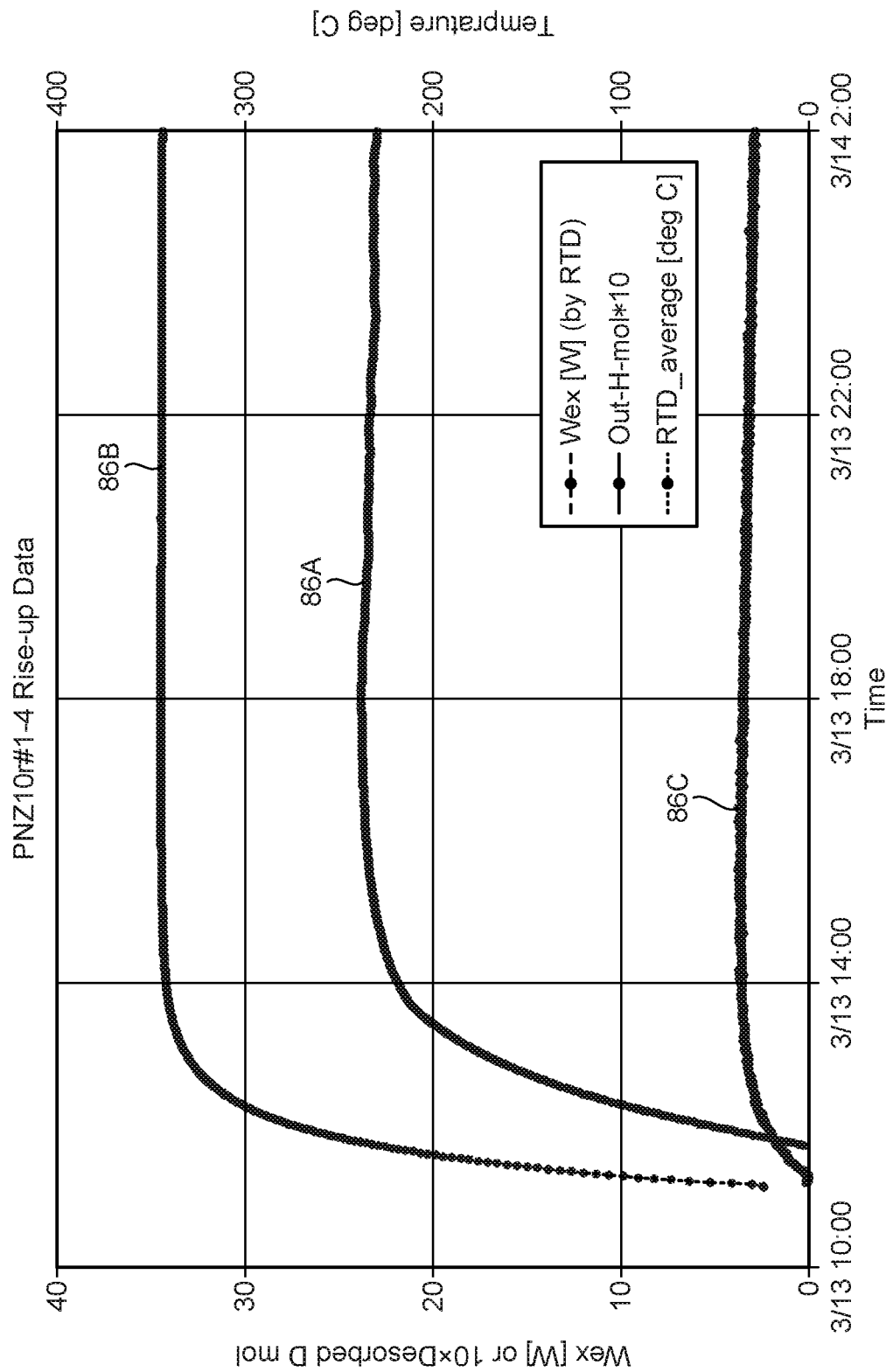
FIG. 12 is a graph illustrating a change in calorific value of PNZ10r #1-4 according to Examples.

FIG. 12 is a graph illustrating a change in calorific value of PNZ10r #1-4 that is the nanocomposite metal material 10F. A line graph 86A is a line graph showing the change in calorific value of PNZ10r #1-4. A line graph 86B is a line graph showing a transition of an average value of measurement results obtained by four temperature sensors 40 (the temperature sensor 40A to the temperature sensor 40D) in the thermal reactor 30. A line graph 86C is a line graph showing the number of moles of hydrogen atoms discharged by the exothermic reaction.

Figure 13:
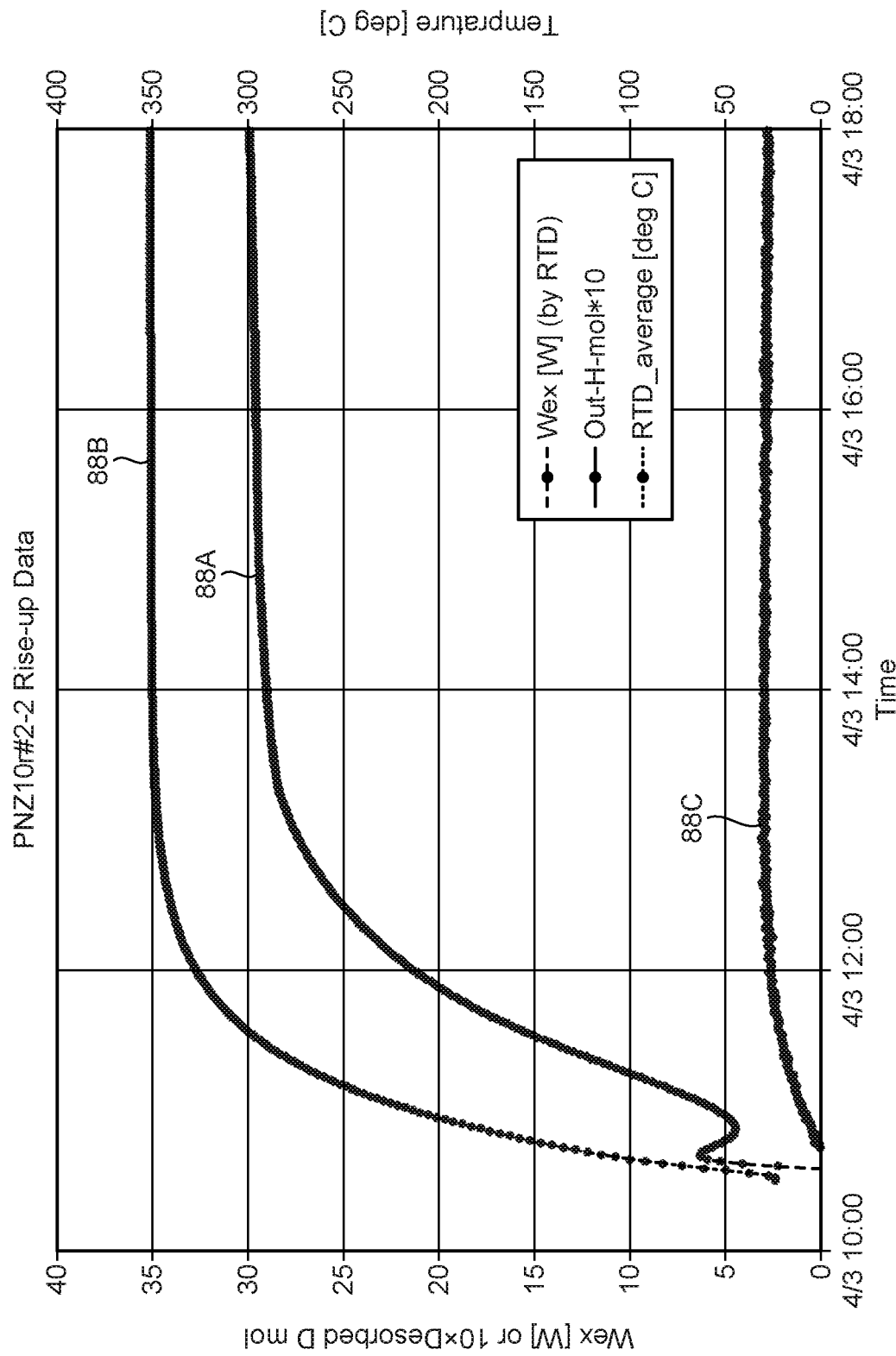
FIG. 13 is a graph illustrating a change in calorific value of PNZ10r #2-2 according to Examples.

FIG. 13 is a graph illustrating a change in calorific value of PNZ10r #2-2 that is the nanocomposite metal material 10F. A line graph 88A is a line graph showing the change in calorific value of PNZ10r #2-2. A line graph 88B is a line graph showing a transition of an average value of measurement results obtained by four temperature sensors 40 (the temperature sensor 40A to the temperature sensor 40D) in the thermal reactor 30. A line graph 88C is a line graph showing the number of moles of hydrogen atoms discharged by the exothermic reaction.

As illustrated in FIGS. 9 to 13, a high calorific value was measured in each of the nanocomposite metal materials 10.

[Evaluation of Calorific Values of CNZ7 and PNZ10 Obtained by Number of Times of Re-Firing]

Figure 14:
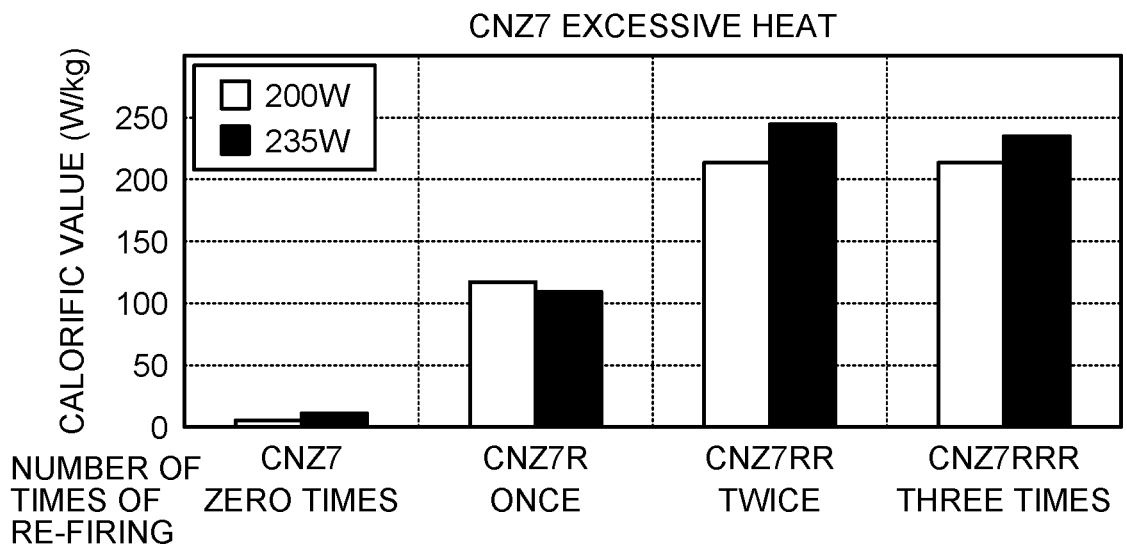
FIG. 14 is a graph illustrating measurement results showing a relationship between calorific values and the numbers of times of firing of CNZ7, CNZ7R, CNZ7RR, and CNZ7RRR according to Examples.

FIG. 14 illustrates measurement results showing a relationship between the calorific value and the number of times of re-firing of each of CNZ7 that is the fine metal particle 20A and CNZ7R, CNZ7RR, and CNZ7RRR that are the nanocomposite metal materials 10G produced using the fine metal particles 20A.

In FIG. 14, the calorific values (also referred to as excessive heat) of CNZ7, CNZ7R, CNZ7RR, and CNZ7RRR in a case where input power supplied to the heating mechanism 38 of the reaction furnace 32 was set to 200 W and 235 W were illustrated.

As illustrated in FIG. 14, regardless of whether the input power applied to the heating mechanism 38 is 200 W or 235 W, the calorific value is increased so that it is substantially proportional to CNZ7RR subjected to the re-firing step twice. However, it is shown that the calorific value of CNZ7RRR subjected to the re-firing step three times is substantially the same as or even lower than that of CNZ7RR.

In addition, in a case where the input power applied to the heating mechanism 38 was 200 W and a case where the input power applied to the heating mechanism 38 was 235 W, the results were shown that the calorific value was generally large at 235 W.

As described above, it has been determined that, in the case of manufacturing the nanocomposite metal material 10G from the fine metal particles 20A, a calorific value to be obtained was likely to be large by increasing the number of times of the re-firing.

However, in the example of FIG. 14, it is shown that the increase in calorific value has peaked in CNZ7RRR subjected to the re-firing three times. In addition, in a case where the input power supplied to the heating mechanism 38 is 200 W and in a case where input power supplied to the heating mechanism 38 is 235 W, a magnitude relationship of the calorific value may be reversed. Therefore, it is considered that there is room for improvement in conditions and the like of the re-firing step.

Figure 15:
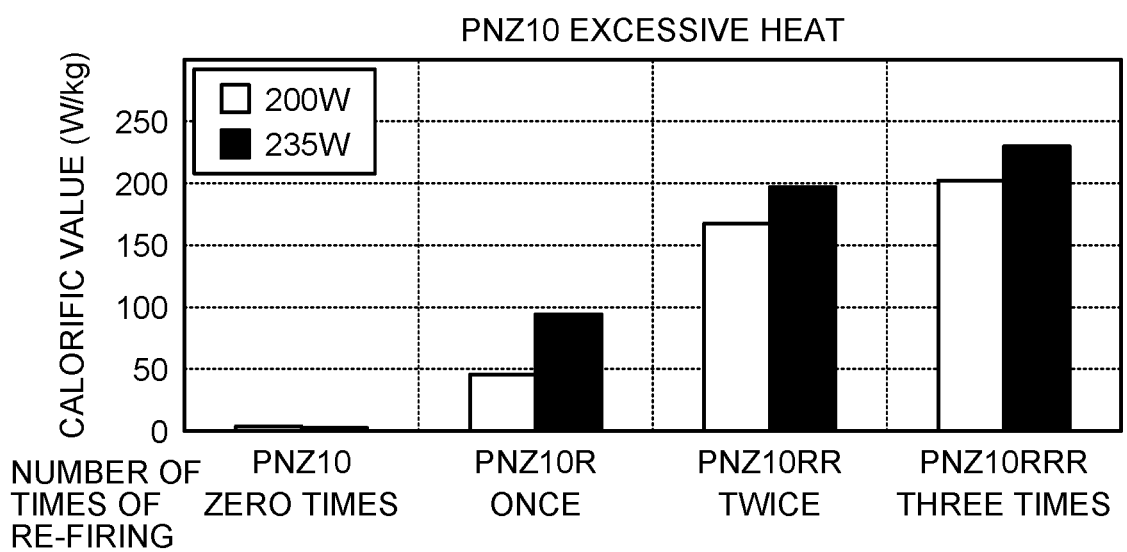
FIG. 15 is a graph illustrating measurement results showing a relationship between calorific values and the numbers of times of firing of PNZ10, PNZ10R, PNZ10RR, and PNZ10RRR according to Examples.

FIG. 15 illustrates measurement results showing a relationship between the calorific value and the number of times of re-firing of each of PNZ10 that is an example of the fine metal particle 20B and PNZ10R, PNZ10RR, and PNZ10RRR that are the nanocomposite metal materials 10H produced from the fine metal particles 20B.

In FIG. 15, the calorific values (also referred to as excessive heat) of PNZ10, PNZ10R, PNZ10RR, and PNZ10RRR in a case where the input power supplied to the heating mechanism 38 of the reaction furnace 32 was set to 200 W and 235 W were illustrated.

As illustrated in FIG. 15, regardless of whether the input power applied to the heating mechanism 38 is 200 W or 235 W, as the number of times of re-firing was increased, the calorific value is also increased. In particular, the calorific value is increased proportionally to PNZ10RR subjected to the re-firing step twice. On the other hand, in PNZ10RRR subjected to the re-firing step three times, it is shown that the increase in calorific value is slightly slowed down.

In addition, in a case where the input power applied to the heating mechanism 38 was 200 W and a case where the input power applied to the heating mechanism 38 was 235 W, the results were shown that the calorific value was generally large at 235 W.

As described above, it has been determined that, in the case of manufacturing the nanocomposite metal material 10B from the fine metal particles 20B, a calorific value to be obtained was likely to be large by increasing the number of times of the re-firing.

However, in the example of FIG. 15, it is shown that the increase in calorific value is slightly slowed down in PNZ10RRR subjected to the re-firing three times. Therefore, it is considered that there is room for improvement in conditions and the like of the re-firing step.

Although the embodiments of the present invention have been described above, the above embodiments have been presented as examples, and are not intended to limit the scope of the invention. The novel embodiments described above can be embodied in a variety of other forms, and various omissions, substitutions, and changes can be made without departing from the gist of the inventions. These embodiments are included in the scope and gist of the invention and are included in the invention described in the claims and the equivalent scope thereof.

EXPLANATIONS OF LETTERS OR NUMERALS 10, 10A, 10B, 10C, 10D, 10E, 10F NANOCOMPOSITE METAL MATERIAL
12 CARRIER
14 TWO-ELEMENT METAL PARTICLE

The invention claimed is:

1. A nanocomposite metal material comprising:
a carrier formed of Zr; and
two-element metal particles supported on the carrier and formed of Cu and Ni,
wherein
a degree of oxidation of the carrier is more than 31% and 100% or less, and
the two-element metal particles each has a core-shell structure with Ni as a core and Cu as a shell, a surface of the core and the shell includes a certain number of heat generation sites so that excessive heat of the nanocomposite metal material is 100 W/kg or more in a case where the nanocomposite metal material is disposed in a reaction furnace of a thermal reactor, the inside of the reaction furnace is brought into a vacuum state, and the inside of the reaction furnace is heated to a temperature range of 250° C. or higher and 350° C. or lower with a heating mechanism included in the thermal reactor while supplying at least one of hydrogen gas and deuterium gas into the reaction furnace, the excessive heat being calculated by comparison with data of a calorific value correction test in which a non-heating blank sample of zirconia beads is charged in the reaction furnace.

2. The nanocomposite metal material according to claim 1, wherein
a ratio of the number of atoms of Cu to Ni is in a range of 1:7 or more and 1:15 or less, and
a ratio of the number of atoms of Ni to Zr is in a range of 1:2 or more and 1:4 or less.

3. The nanocomposite metal material according to claim 1, wherein the number of heat generation sites is more than the number of heat generation sites of a surface of the core and the shell that have not undergone a re-firing after a hydrogen absorption and desorption.

* * * * *